United States Patent
Choi et al.

(10) Patent No.: US 10,149,161 B2
(45) Date of Patent: Dec. 4, 2018

(54) ELECTRONIC DEVICE FOR AUTHENTICATING BASED ON BIOMETRIC DATA AND OPERATING METHOD THEREOF

(71) Applicant: SAMSUNG ELECTRONICS CO., LTD., Suwon-si, Gyeonggi-do (KR)

(72) Inventors: Wooyoung Choi, Hwaseong-si (KR); Hakjoo Kim, Yongin-si (KR); Sangho Park, Anyang-si (KR); Yong-Jun Park, Suwon-si (KR); Gwiho Lee, Uiwang-si (KR); Ho-Dong Jwa, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/426,274

(22) Filed: Feb. 7, 2017

(65) Prior Publication Data
US 2017/0245145 A1 Aug. 24, 2017

(30) Foreign Application Priority Data
Feb. 19, 2016 (KR) .................. 10-2016-0020047

(51) Int. Cl.
H04W 12/06 (2009.01)
H04L 29/06 (2006.01)
(Continued)

(52) U.S. Cl.
CPC ......... *H04W 12/06* (2013.01); *H04L 63/0861* (2013.01); *H04W 4/80* (2018.02); *H04W 76/14* (2018.02); *H04M 2203/6054* (2013.01)

(58) Field of Classification Search
CPC . H04L 63/0861; H04L 63/08; H04L 63/0823; H04L 63/083; H04L 63/107;
(Continued)

(56) References Cited

U.S. PATENT DOCUMENTS

2007/0288995 A1 12/2007 Terada et al.
2008/0282330 A1 11/2008 Su
(Continued)

FOREIGN PATENT DOCUMENTS

| KR | 10-2010-0029918 | 3/2010 |
|----|-----------------|--------|
| KR | 10-2014-0025736 | 3/2014 |

OTHER PUBLICATIONS

Search Report and Written Opinion dated Jun. 13, 2017 in counterpart International Patent Application No. PCT/KR2017/001448.

*Primary Examiner* — Yong Hang Jiang
(74) *Attorney, Agent, or Firm* — Nixon & Vanderhye P.C.

(57) ABSTRACT

The present disclosure relates generally to a device and method for performing authentication using biometric data in an electronic device. The electronic device can include a memory for storing biometric authentication information about one or more external electronic devices and one or more identification information corresponding to each of the one or more external electronic devices, the one or more external electronic devices including sensors configured to acquire biometric data corresponding to the biometric authentication information, and a processor. The processor can be configured to receive a request related with authentication, to select at least one external electronic device from among the one or more external electronic devices in relation with the authentication, to transmit a request for authentication to the at least one external electronic device, using at least one identification information corresponding to the at least one external electronic device from among the one or more identification information, and to perform the authentication based at least on authentication information received from the at least one external electronic device and the biometric authentication information.

20 Claims, 16 Drawing Sheets

(51) Int. Cl.
*H04W 4/80* (2018.01)
*H04W 76/14* (2018.01)

(58) Field of Classification Search
CPC ......... H04M 2203/6054; H04W 12/06; H04W 4/008; H04W 76/023; H04W 24/00; H04W 84/18; H04W 88/02; H04W 8/005; H04W 8/26; G06F 21/32; G06F 2221/2139; G06K 9/00
See application file for complete search history.

(56) References Cited

U.S. PATENT DOCUMENTS

| | | |
|---|---|---|
| 2013/0078923 A1 | 3/2013 | Ekbatani et al. |
| 2014/0136720 A1 | 5/2014 | Bonazolli et al. |
| 2015/0121514 A1* | 4/2015 | Park ................. G06F 21/34 726/19 |
| 2015/0180866 A1 | 6/2015 | Hama |
| 2016/0098591 A1* | 4/2016 | Li ..................... H04L 63/08 382/119 |
| 2016/0105424 A1* | 4/2016 | Logue ............ H04L 63/0823 726/7 |
| 2017/0017826 A1* | 1/2017 | Slaby ............. G06K 9/00033 |

* cited by examiner

ELECTRONIC DEVICE FOR AUTHENTICATING BASED ON BIOMETRIC DATA AND OPERATING METHOD THEREOF

CROSS REFERENCE TO RELATED APPLICATION

This application is based on and claims priority under 35 U.S.C. § 119 to Korean Application Serial No. 10-2016-0020047, which was filed in the Korean Intellectual Property Office on Feb. 19, 2016, the content of which is incorporated by reference herein in its entirety.

BACKGROUND

1. Field of the Disclosure

The present disclosure relates generally to an electronic device for authenticating based on biometric data and an operating method thereof.

2. Description of Related Art

In recent years, as the importance of personal information protection, etc., increases, a security service using user's biometric recognition such as face recognition, iris recognition, fingerprint recognition, etc. is increasing. For example, electronic devices are providing an authentication service of recognizing user's biometric data through a medical sensor, converting the recognized biometric data into digital information, encrypting the digital information, and using the encrypted information as user authentication information. At present, an authentication scheme is being provided in which an electronic device not equipped with a medical sensor acquires biometric data from an external electronic device equipped with the medical sensor, and performs user authentication.

In a case where an electronic device intends to acquire biometric data from an external electronic device with a medical sensor for the purpose of user authentication, it is difficult to determine from which peripheral external device the electronic device has to acquire biometric data. Accordingly, in the conventional art, the electronic device should attempt coupling and request biometric data to all of peripheral external electronic devices. This causes a problem that a very long time is required for user authentication.

SUMMARY

To address this problem, various example embodiments of the present disclosure provide an authentication device and method for selecting an external electronic device for acquiring biometric data in an electronic device not equipped with a medical sensor.

An electronic device according to various example embodiments of the present disclosure may include a memory configured to store biometric authentication information of one or more external electronic devices and one or more identification information corresponding to the one or more external electronic devices, the one or more external electronic devices including sensors for acquiring biometric data corresponding to the biometric authentication information, and a processor. The processor can be configured to receive a request for authentication, to select at least one external electronic device among the one or more external electronic devices for the authentication, to transmit a request for authentication to the at least one external electronic device, using at least one identification information corresponding to the at least one external electronic device among the one or more identification information, and to perform the authentication, based at least on authentication information received from the at least one external electronic device and the biometric authentication information.

A method for operating an electronic device according to various example embodiments of the present disclosure may include the operations of storing biometric authentication information of one or more external electronic devices and one or more identification information corresponding to the one or more external electronic devices, the one or more external electronic devices including sensors for acquiring biometric data corresponding to the biometric authentication information, receiving a request for authentication, selecting at least one external electronic device among the one or more external electronic devices for the authentication, transmitting a request for authentication to the at least one external electronic device, using at least one identification information corresponding to the at least one external electronic device among the one or more identification information, and performing the authentication, based at least on authentication information received from the at least one external electronic device and the biometric authentication information.

A computer-readable recording medium according to various example embodiments of the present disclosure can include a program for executing the operations of storing biometric authentication information of one or more external electronic devices and one or more identification information corresponding to the one or more external electronic devices, the one or more external electronic devices comprising sensors for acquiring biometric data corresponding to the biometric authentication information, receiving a request for authentication, selecting at least one external electronic device among the one or more external electronic devices for the authentication, transmitting a request for authentication to the at least one external electronic device, using at least one identification information corresponding to the at least one external electronic device among the one or more identification information, and performing the authentication, based at least on authentication information received from the at least one external electronic device and the biometric authentication information.

BRIEF DESCRIPTION OF THE DRAWINGS

These and other aspects, features and attendant advantages of the present disclosure will become more readily understood and appreciated from the following detailed description, taken in conjunction with the accompanying drawings, in which like reference numerals refer to like elements, and wherein.

DETAILED DESCRIPTION

Figure 1:
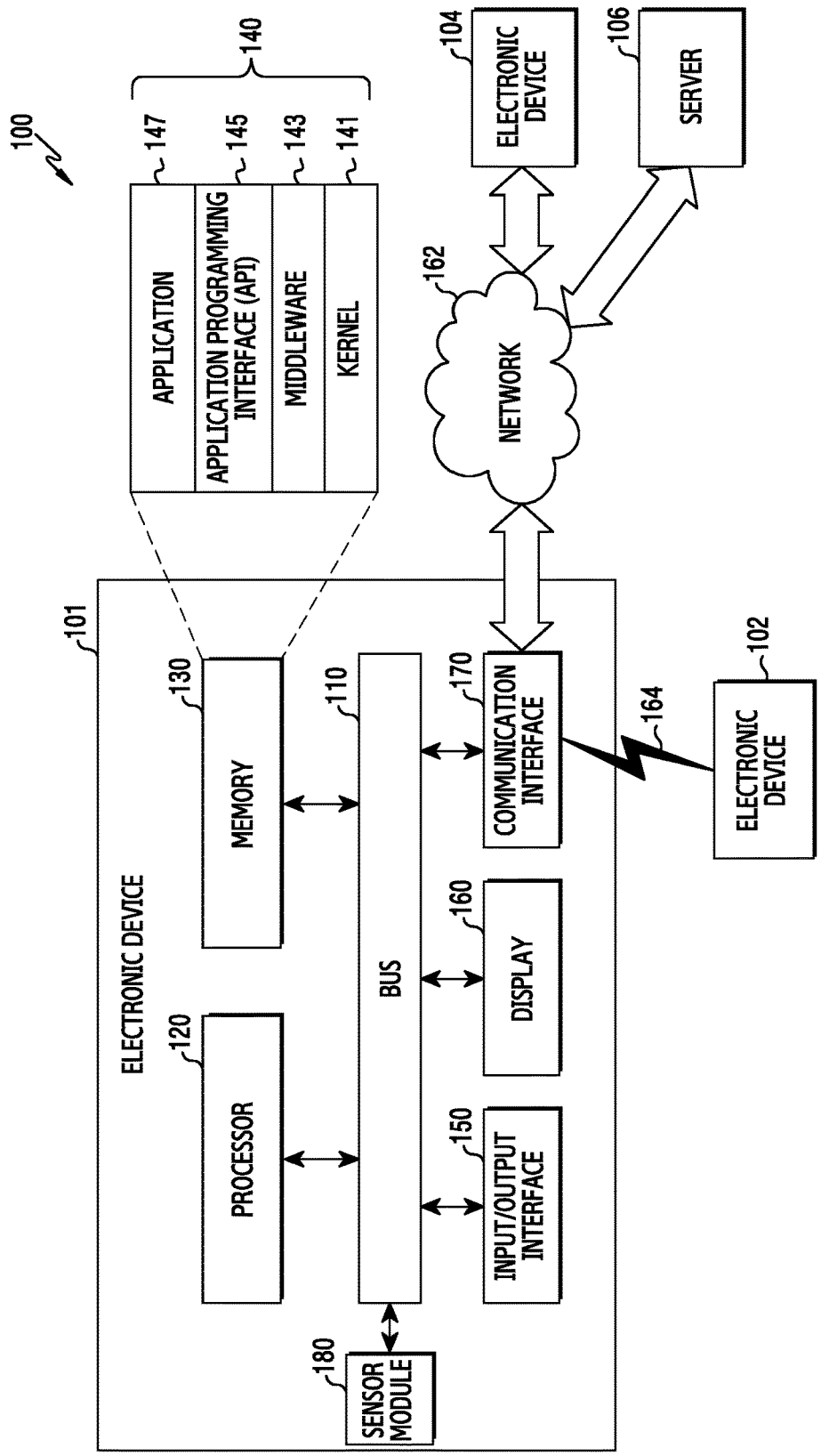
FIG. 1 is a diagram illustrating an example network environment including an electronic device according to various example embodiments of the present disclosure.

Hereinafter, various example embodiments of the present disclosure will be described with reference to the accompanying drawings. However, it should be understood that there is no intent to limit the present disclosure to the particular forms disclosed herein; rather, the present disclosure should be understood to cover various modifications, equivalents, and/or alternatives of the various example embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not preclude the existence of one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including both at least one A and at least one B.

The expression "a first", "a second", "the first", or "the second" used in various example embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. On the other hand, it may be understood that when an element (e.g., first element) is referred to as being "directly connected," or "directly coupled" to another element (second element), there are no element (e.g., third element) interposed between them.

The expression "configured to" used in the present disclosure may be used interchangeably with, for example, "suitable for", "having the capacity to", "designed to", "adapted to", "made to", or "capable of" according to the situation. The term "configured to" may not necessarily imply "specifically designed to" in hardware. In some situations, the expression "device configured to" may refer to a situation in which the device, together with other devices or components, "is able to". For example, the phrase "processor adapted (or configured) to perform A, B, and C" may refer, for example, to a dedicated processor (e.g. embedded processor) for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing various embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even if the term is defined in the present disclosure, it should not be interpreted to exclude embodiments of the present disclosure.

An electronic device according to various example embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device, or the like, but is not limited thereto. According to various example embodiments, the wearable device may include at least one of an accessory type (e.g., a watch, a ring, a bracelet, an anklet, a necklace, a glasses, a contact lens, or a Head-Mounted Device (HIVID)), a fabric or clothing integrated type (e.g., an electronic clothing), a body-mounted type (e.g., a skin pad, or tattoo), and a bio-implantable type (e.g., an implantable circuit), or the like, but is not limited thereto.

According to some example embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame, or the like, but is not limited thereto.

According to another example embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.), or the like, but is not limited thereto.

According to some example embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter), or the like, but is not limited thereto. The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various example embodiments will be described with reference to the accompanying drawings. As used herein, the term "user" may indicate a person who uses an electronic device or a device (e.g., an artificial intelligence electronic device) that uses an electronic device.

FIG. 1 illustrates a network environment including an electronic device according to various exemplary embodiments of the present invention.

Referring to FIG. 1, the electronic device 101 can include a bus 110, a processor 120, a memory 130, an input output interface 150, a display 160, a communication interface 170, and a sensor module 180. According to various exemplary embodiments of the present invention, the electronic device 101 can omit at least one of the aforementioned constituent elements, or can additionally have another constituent element.

The bus 110 can be a circuit mutually coupling the aforementioned constituent elements (e.g., the processor 120, the memory 130, the input output interface 150, the display 160, the communication interface 170, etc.), and forwarding communication (e.g., a control message and/or data) between the aforementioned constituent elements.

The processor 120 can include one or more of a Central Processing Unit (CPU), an Application Processor (AP), or a Communication Processor (CP). The processor 120 can, for example, execute operation or data processing for control and/or communication of at least one another constituent element of the electronic device 101.

According to various exemplary embodiments, the processor 120 can acquire biometric data and external electronic device related information from an external electronic device (e.g., electronic device 102), and store the acquired information in the memory 130. The biometric data can be user's own information that is acquired according to a user's body feature. The biometric data can, for example, include a physical feature such as a shape of the fingerprint of a user, a shape of the iris, a shape of the retina, a shape of a vein near the wrist, a shape of the ear, a shape of the face, a shape of the hand, etc. Or, the biometric data can be physical information of various signals outputted from the user's body, such as a voice, a brain wave, a hear rate waveform, etc. as well. Or, the biometric data can include user discriminative behavior information such as a walking habit, a typing habit, etc., or include information used for chemical recognition such as DNA matching, smell, etc. as well For example, the biometric data is not limited in kind, so long as being information including a mutually different feature in accordance with the user. The external electronic device related information can include identification information of the external electronic device, or type information about a medical sensor of the external electronic device. The identification information of the external electronic device can include a Medium Access Control (MAC) address, for example. But, in various exemplary embodiments of the present invention, the external electronic device related information is not limited to this, and can include another information.

According to one exemplary embodiment, the processor 120 can sense a biometric authentication information registration event in response to a user input or a request of an external electronic device. In response to the sensing of the biometric authentication information registration event, the processor 120 can search an external electronic device whose short-range communication coupling is available, and perform the short-range communication coupling with the searched external electronic device. For example, in case where a menu item for biometric authentication information registration is selected in a state in which the processor 120 is connected to a specific account (or a user log-in is performed), the processor 120 can broadcast a search request signal for searching external electronic devices whose communication coupling is available, using a short-range communication protocol. By receiving a response signal to the search request signal, the processor 120 can search the external electronic device whose short-range communication coupling is available. The processor 120 can determine external electronic devices having transmitted response signals as the external electronic devices whose short-range communication coupling is available, and display a list of the determined external electronic devices on a screen. The processor 120 can select one external electronic device among the external electronic devices within the list based on a user input, and perform short-range communication coupling with the selected external electronic device.

According to one exemplary embodiment, to register biometric authentication information on an external electronic device to the memory 130 of the electronic device 101, the processor 120 can transmit a biometric authentication information registration request signal to an external electronic device whose communication has been coupled, and receive a biometric authentication information registration response signal from the external electronic device. The biometric authentication information registration response signal can include authentication information (e.g., public key) of the external electronic device and external electronic device related information thereof. The authentication information can be generated based on identification information (e.g., IDentification (ID) and MAC address) of the external electronic device. According to one exemplary embodiment, in case where the biometric authentication information registration response signal including the authentication information is received from the external electronic device, the processor 120 can check that user's biometric data has been stored in the external electronic device, and store the received authentication information.

According to one exemplary embodiment, the processor 120 can check account information corresponding to a biometric authentication information registration event, and register authentication information included in a biometric authentication information registration response signal as biometric authentication information about the checked account. For example, the processor 120 can determine authentication information received from an external electronic device, as an authentication key value capable of acquiring an access authority over an account at which the biometric authentication information registration event is sensed. And, the processor 120 can register and/or store the received authentication information as biometric authentication information about the corresponding account. For instance, in case where the account at which the biometric authentication registration event has occurred is a 1st account, and a public key included in the biometric authentication information registration response signal is "A", the processor 120 can designate the public key "A" as biometric authentication information about the 1st account, and store information representing that the biometric public key on the 1st account is "A" in the memory 130.

According to one exemplary embodiment, the processor 120 can check account information corresponding to a biometric authentication information registration event, and store external electronic device related information included in a biometric authentication information registration response signal, as information of the electronic device corresponding to the checked account. For example, in case where an account at which the biometric authentication information registration event has been sensed is a 1st account, the processor 120 can map and store identification information of an external electronic device and/or medical sensor type information of the external electronic device, as information of an authentication device about the 1st account. For instance, in case where the account at which the biometric authentication registration event has occurred is the 1st account, and the external electronic device related information included in the biometric authentication information registration response signal is "identification information: a" and/or "medical sensor type information: fingerprint", the processor 120 can designate the "identification information: a" and/or the "medical sensor type information: fingerprint" as the information of the authentication device corresponding to the 1st account, and store information representing that the information of the authentication device corresponding to the 1st account is the "identification information: a" and/or the "medical sensor type information: fingerprint", in the memory 130.

According to one exemplary embodiment, in case where a biometric authentication information registration response signal is received, the processor 120 can check if authentication information (e.g., public key) included in the biometric authentication information registration response signal has been already registered as biometric authentication information about an account at which a biometric authentication information registration event has occurred. If it is checked that the authentication information included in the biometric authentication information registration response signal has been already registered as the biometric authentication information about the corresponding account, the processor 120 can display information notifying that it is the already registered authentication information, on a screen. Also, the processor 120 can couple communication with a searched another external electronic device, and transmit a biometric authentication information registration request signal to the another external electronic device. If it is checked that the authentication information included in the biometric authentication information registration response signal has not been registered as the biometric authentication information about the corresponding account, the processor 120 can retransmit a biometric authentication information registration request signal to a corresponding external electronic device, and re-receive a biometric authentication information registration response signal from the corresponding external electronic device. This is for checking whether authentication information received from the external electronic device is accurate. For example, the processor 120 can compare authentication information firstly received and authentication information secondly received from the external electronic device during a biometric authentication information registration procedure. If the firstly received authentication information and the secondly received authentication information are the same as each other, the processor 120 can register the corresponding authentication information as the biometric authentication information about the corresponding account. In case where the firstly received authentication information and the secondly received authentication information are not the same as each other, the processor 120 can display information representing that the firstly received authentication information and the secondly received authentication information are different mutually on a screen, and retransmit a biometric authentication information registration request signal to a corresponding external electronic device.

According to one exemplary embodiment, in case where a biometric authentication information registration response signal is not received from an external electronic device, the processor 120 can couple communication with a searched another external electronic device, and transmit a biometric authentication information registration request signal to the another external electronic device.

According to various exemplary embodiments, the processor 120 can set a master device among authentication devices to the memory 130. For example, the processor 120 can set, as a master device, one external electronic device among external electronic devices having been registered as authentication devices corresponding to an account. According to one exemplary embodiment, the processor 120 can execute an application for setting a master device by a user input, and display an application screen that includes a list of external electronic devices having been registered as authentication devices to the memory 130. The application screen can include a user interface in which master device setting is available. The processor 120 can select one external electronic device in the external electronic device list by a user input, and set the selected external electronic device as the master device. The processor 120 can set one master device on a per-account basis, or set only one master device irrespective of an account as well. For example, in case where authentication devices corresponding to a 1st account are a 1st external electronic device, a 2nd external electronic device, and a 3rd external electronic device, and authentication devices corresponding to a 2nd account are a 4th external electronic device and a 5th external electronic device, the processor 120 can set the 2nd external electronic device as a master device of the 1st account, and set the 4th external electronic device as a master device of the 2nd account. Or, the processor 120 can set the 2nd external electronic device as a master device of the electronic device, irrespective of an account.

According to various exemplary embodiments, the processor 120 can sense an authentication request event, and select an external electronic device to request for authentication, based on information of an authentication device stored in the memory 130. The authentication request event can be, for example, sensed by a user input, or a signal received from the external electronic device. According to one exemplary embodiment, the processor 120 can select an external electronic device to request for authentication, among external electronic devices registered as authentication devices. For example, the processor 120 can generate a candidate external electronic device list based on the external electronic devices registered as the authentication devices, and select an external electronic device to request for authentication within the candidate external electronic device list. According to one exemplary embodiment, the processor 120 can search external electronic device whose short-range communication coupling is available among the external electronic devices registered as the authentication devices, and select an external electronic device to request for authentication among the searched external electronic devices. For example, the processor 120 can broadcast a search request signal for searching external electronic devices whose communication coupling is available, using a short-range communication protocol, and determine external electronic devices having transmitted response signals responsive to the search request signal, as the external electronic devices whose short-range communication coupling is available. The processor 120 can generate a candidate external electronic device list to request for authentication, based on a list representing external electronic devices whose short-range communication coupling is available and a list representing external electronic devices registered as authentication devices. For instance, the processor 120 can generate a candidate external electronic device list representing external electronic devices which have been registered as authentication devices while being available for short-range communication coupling with the electronic device, and select an external electronic device to request for authentication within the generated candidate external electronic device list.

According to one exemplary embodiment, in case where the processor 120 can identify an account at which an authentication request event has occurred, the processor 120 can generate a candidate external electronic device list by using only external electronic devices corresponding to the account at which the authentication request event has occurred among a plurality of external electronic devices registered as authentication devices to the memory 130. For example, in case where an authentication request event for a 1st account takes place, the processor 120 can generate a candidate external electronic device list including only external electronic devices corresponding to the 1st account. For another example, in case where the authentication request event for the 1st account takes place, the processor 120 can generate a candidate external electronic device list including only external electronic devices whose short-range communication coupling is available among external electronic devices corresponding to the 1st account.

According to one exemplary embodiment, in case where the processor 120 can identify the type of biometric authentication information corresponding to an authentication request event, the processor 120 can generate a candidate external electronic device list by using only external electronic devices whose medical sensor type corresponds to the identified type of the biometric authentication information among a plurality of external electronic devices having been registered as authentication devices to the memory 130. For example, in case where an authentication request event using fingerprint recognition takes place, the processor 120 can generate a candidate external electronic device list including only external electronic devices whose medical sensor types are finger scan sensors among a plurality of external electronic devices having been registered as authentication devices to the memory 130. For another example, in case where the authentication request event using the fingerprint recognition takes place, the processor 120 can generate a candidate external electronic device list including only external electronic devices whose medical sensor types are finger scan sensors while short-range communication coupling is available among a plurality of external electronic devices having been registered as authentication devices to the memory 130. For further example, in case where an authentication request event using facial recognition takes place, the processor 120 can generate a candidate external electronic device list including only external electronic devices whose medical sensor types are finger scan sensors while short-range communication coupling is available among a plurality of external electronic devices having been registered as authentication devices to the memory 130.

According to various exemplary embodiments, the processor 120 can select an external electronic device to request for authentication, based on the number of external electronic devices included in the candidate external electronic device list, external electronic device related information (e.g., identification information, sensor type information), additional information, or a combination thereof. The additional information can include account information, information representing a master device or not, the latest connection time information, use frequency information, or a combination thereof. The latest connection time information can be information representing a time point of connecting to a corresponding account based on authentication information received from a corresponding external electronic device. The latest connection time information can be updated at a time point of succeeding in connection to the corresponding account based on the authentication information received from the corresponding external electronic device, and/or a time point of releasing the connection to the corresponding account that is being connected. The latest connection time information can be information representing the last connection time point among time points of connecting to the corresponding account based on the authentication information received from the corresponding external electronic device. Or, the latest connection time information can be information representing a time point of connecting to the corresponding account based on the authentication information received from the corresponding external electronic device, during a preset past constant time duration from a current time point. For example, although the connection to the corresponding account is made based on the authentication information received from the corresponding external electronic device, in case where the connected time point does not correspond to the preset past constant time duration from the current time point, the latest connection time information of the corresponding external electronic device may not exist. For instance, in case where the time point of connecting to the corresponding account based on the received authentication information is a time point earlier than one month from the current time point, and the preset past time duration is one week, the latest connection time point of the corresponding external electronic device may not exist. In contrast, in case where the time point of connecting to the corresponding account based on the received authentication information is a time point earlier than three days from the current time point, and the preset past time duration is one week, the latest connection time point of the corresponding external electronic device can represent the time point earlier than three days from the current time point. The use frequency information can represent the number of times connecting to the corresponding account based on the authentication information received from the corresponding external electronic device, during a preset time duration. For example, the use frequency information can be information representing how often it has connected to the corresponding account based on the authentication information received from the corresponding external electronic device.

According to one exemplary embodiment, in case where one external electronic device is included in a candidate external electronic device list, the processor 120 can select corresponding one external electronic device.

According to one exemplary embodiment, in case where a plurality of external electronic devices are included in a candidate external electronic device list, the processor 120 can determine the order of priority of the external electronic devices, based on at least one of identification information of each of the external electronic devices registered as authentication devices, sensor type information, account information, information representing a master device or not, the latest connection time information, use frequency information, or a combination thereof. For example, the processor 120 can determine that the order of priority of an external electronic device that is set as a master device among the plurality of external electronic devices is highest. For another example, the processor 120 can determine the order of priority based on the latest connection time information of the plurality of external electronic devices. For instance, the processor 120 can set highest the order of priority of an external electronic device whose latest connection time is shortest to a current time point, and set lowest the order of priority of an external electronic device whose latest connection time is longest from the current time point. For further example, the processor 120 can determine the order of priority based on the use frequencies of the plurality of external electronic devices. For instance, the processor 120 can set highest the order of priority of an external electronic device whose use frequency is highest, and set lowest the order of priority of an external electronic device whose use frequency is lowest. For yet another example, the processor 120 can assign the highest priority order to an external electronic device set as a master device among the plurality of external electronic devices and then, sequentially assign a next high priority order to an 'n' number of external electronic devices based on the latest connection time information among the remnant external electronic devices. The 'n' can be an integer greater than or equal to 1. Also, the processor 120 can sequentially assign a next high priority order to an 'm' number of external electronic devices based on a use frequency among the remnant external electronic devices. The 'm' can be an integer greater than or equal to 1. For instance, the processor 120 can assign "priority order: 1" to a 2nd external electronic device set as a master device among ten external electronic devices (e.g., 1st external electronic device to 10th external electronic device), and select a 4th external electronic device and the 1st external electronic device based on the latest connection time information among the remnant external electronic devices excluding the 2nd external electronic device, and assign "priority order: 2" to the 4th external electronic device, and assign "priority order: 3" to the 1st external electronic device. Also, the processor 120 can select a 7th external electronic device based on a use frequency among the remnant external electronic devices excluding the 2nd external electronic device, the 4th external electronic device, and the 1st external electronic device, and assign "priority order: 4" to the 7th external electronic device.

According to one exemplary embodiment, the processor 120 can select an external electronic device to request for authentication based on the order of priority of external electronic devices included in a candidate external electronic device list, and attempt communication coupling with the selected external electronic device. For example, the processor 120 can select an external electronic device whose priority order is set highest among external electronic devices registered as authentication devices, and transmit a short-range communication coupling request signal to the selected external electronic device. According to one exemplary embodiment, in case where the communication coupling with the selected external electronic device fails, the processor 120 can select an external electronic device to request for authentication in the candidate external electronic device list, based on the order of priority of the remnant external electronic devices excluding an external electronic device whose communication coupling fails. For example, the processor 120 deletes the external electronic device whose communication coupling fails from the candidate external electronic device list, thereby being capable of updating the candidate external electronic device list, and selecting an external electronic device to request for authentication in the updated candidate external electronic device list. By receiving a short-range communication coupling response signal from the selected external electronic device, the processor 120 can perform short-range communication coupling with the selected external electronic device.

According to one exemplary embodiment, in case where short-range communication is coupled with the selected external electronic device, the processor 120 can transmit a biometric authentication request signal to the selected external electronic device. The biometric authentication information request signal can include data that is encoded based on previously registered biometric authentication information. For example, the processor 120 can encode random data based on a public key and then, generate and transmit a biometric authentication information request signal including the encoded random data. The biometric authentication information request signal can be transmitted using a short-range communication protocol. According to one exemplary embodiment, in response to the biometric authentication request signal, the processor 120 can receive a biometric authentication response signal from the selected external electronic device. The biometric authentication response signal can include random data and authentication information (e.g., public key). The random data is a result of decoding by a private key the encoded random data included in the biometric authentication request signal. The authentication information included in the biometric authentication response signal can include a public key that is generated based on identification information (e.g., an IDentification (ID) and/or a MAC address) of the external electronic device.

According to one exemplary embodiment, the processor 120 can determine authentication success or non-success based on the authentication information and the random data that are included in the biometric authentication response signal. For example, in case where the authentication information included in the biometric authentication response signal and the previously registered biometric authentication information are the same as each other, and the random data included in the biometric authentication response signal and the random data that the electronic device 101 transmits as including in the biometric authentication request signal are the same as each other, the processor 120 can determine that authentication on an account corresponding to the corresponding biometric authentication information succeeds. According to one exemplary embodiment, in case where the random data included in the biometric authentication response signal and the random data that the electronic device 101 transmits as including in the biometric authentication request signal are the same as each other, and the external electronic device having transmitted the biometric authentication response signal and an external electronic device registered as an authentication device of an account at which a biometric authentication event has occurred are the same as each other, the processor 120 can determine that the authentication on the account corresponding to the corresponding biometric authentication information succeeds. At authentication success, the processor 120 can perform an operation corresponding to the authentication success, and display a user interface corresponding to this, and/or display a user interface having a connection authority corresponding to the account. According to one exemplary embodiment, in case where the authentication information included in the biometric authentication response signal and the previously registered biometric authentication information are not the same as each other, the processor 120 can determine that the authentication on the account fails. According to one exemplary embodiment, in case where the random data included in the biometric authentication response signal and the random data that the electronic device 101 transmits as including in the biometric authentication request signal are not the same as each other, the processor 120 can determine that the authentication on the account fails. According to one exemplary embodiment, in case where the external electronic device having transmitted the biometric authentication response signal and the external electronic device registered as the authentication device of the account at which the biometric authentication event has occurred are not the same as each other, the processor 120 can determine that the authentication on the account fails.

According to one exemplary embodiment, the processor 120 can receive a failure message from an external electronic device. For example, in response to a biometric authentication request signal, the processor 120 can receive a signal representing a biometric authentication information acquisition failure.

According to one exemplary embodiment, at authentication failure, the processor 120 deletes an authentication-failed external electronic device from a candidate external electronic device list, thereby being capable of updating the candidate external electronic device list, and selecting another external electronic device based on the order of priority of external electronic devices included in the updated candidate external electronic device list. The processor 120 can attempt communication coupling to the selected another external electronic device. In case where the communication coupling succeeds, the processor 120 can transmit a biometric authentication request signal. According to one exemplary embodiment, at authentication failure with the external electronic device, the processor 120 can display information notifying that authentication on the corresponding external electronic device fails on a screen. Or, at authentication failure with the external electronic device, the processor 120 can transmit a message of notifying that authentication fails to the corresponding external electronic device.

According to various exemplary embodiments, the processor 120 can receive a biometric authentication information registration request signal from an external electronic device (e.g., electronic device 102), and transmit a biometric authentication information response signal including biometric data. According to one exemplary embodiment, the processor 120 can perform short-range communication coupling with the external electronic device, and receive the biometric authentication information registration request signal from the external electronic device. According to one exemplary embodiment, the processor 120 can check authentication information previously stored in the memory 130, and transmit a biometric authentication information registration response signal including the checked authentication information to the external electronic device. For example, the processor 120 can generate authentication information based on identification information (e.g., an ID, a MAC address, etc.) of the electronic device. The authentication information can include an encryption key pair (e.g., public key and private key).

According to one exemplary embodiment, when a biometric authentication information registration request signal is received, the processor 120 can display a screen of requesting biometric authentication information registration, and drive a medical sensor included in the sensor module 180 in order to acquire biometric data. The processor 120 can acquire the biometric data through the driven medical sensor, and store the acquired biometric data in a secure area within the memory 130. In case where the biometric data is acquired and stored successfully, the processor 120 can generate and store authentication information for biometric authentication. For example, the processor 120 can generate an encryption key pair including authentication information (e.g., public key and private key) based on identification information (e.g., an ID, a MAC address, etc.) of the electronic device. According to one exemplary embodiment, the processor 120 can transmit a biometric authentication information registration response signal including the generated authentication information, to the external electronic device. For example, the processor 120 can transmit the biometric authentication information registration response signal including the public key, to the external electronic device. According to one exemplary embodiment, the processor 120 can receive a signal representing biometric authentication information registration success or non-success from the external electronic device. The processor 120 can display a screen representing biometric authentication information registration success or non-success.

According to various exemplary embodiments, the processor 120 can receive a biometric authentication request signal including encoded random data from an external electronic device (e.g., electronic device 102), and transmit a biometric authentication response signal including random data and authentication information (e.g., public key). According to one exemplary embodiment, the processor 120 can perform short-range communication coupling with the external electronic device, and receive the biometric authentication request signal from the external electronic device. According to one exemplary embodiment, when the biometric authentication request signal is received, the processor 120 can display a screen of requesting a biometric data input, and drive a medical sensor included in the sensor module 180 in order to acquire biometric data. The processor 120 can acquire the biometric data through the driven medical sensor, and perform authentication based on the acquired biometric data and previously stored biometric data. According to one exemplary embodiment, the processor 120 can decode the encoded random data included in the biometric authentication request signal based on a private key. According to one exemplary embodiment, in case where the authentication succeeds, the processor 120 can transmit a biometric authentication response message including encoded data and previously stored authentication information (e.g., public key), to the external electronic device. According to one exemplary embodiment, the processor 120 can receive a signal representing the authentication result that uses biometric data, from the external electronic device. The processor 120 can display a screen of representing whether the authentication using the biometric data has succeeded, based on the signal representing the authentication result.

According to one exemplary embodiment, in case where biometric data is not acquired through the sensor module 180, the processor 120 can transmit a failure message or failure signal representing a biometric data acquisition failure to the external electronic device.

The memory 130 can include a volatile memory and a non-volatile memory. The memory 130 can store a command or data related to at least one another constituent element of the electronic device 101. According to one exemplary embodiment, the memory 130 can store account information of the electronic device 101, biometric authentication information about an account, authentication device information about the account, etc. Here, the biometric authentication information about the account can include a public key and identification information (e.g., MAC address) of an external electronic device. The authentication device information about the account can include external electronic device related information received from the external electronic device corresponding to the account, and additional information acquired through connection of the external electronic device and/or a user. The external electronic device related information can include identification information of the external electronic device, and medical sensor type information of the external electronic device. The additional information can include account information, information representing a master device or not, the latest connection time information, use frequency information, or a combination thereof. According to one exemplary embodiment, the memory 130 can store biometric authentication information about an account, and user's biometric data.

Here, the biometric authentication information about the account can include a public key and/or a private key. But, according to various exemplary embodiments of the present invention, the external electronic device related information and the additional information are not limited to the aforementioned information, and can include another information.

The kernel 141 can control or manage system resources (e.g., bus 110, processor 120, memory 130, etc.) that are used for executing operations or functions implemented in the other programs (e.g., middleware 143, API 145, or application 147). The kernel 141 can provide an interface through which the middleware 143, the API 145, or the application 147 can control or manage the system resources of the electronic device 101 by accessing the individual constituent element of the electronic device 101.

The middleware 143 can perform a relay role of enabling the API 145 or the application 147 to communicate and exchange data with the kernel 141. Also, the middleware 143 can process one or more work requests received from the application 147 in accordance with the order of priority. For example, the middleware 143 can grant at least one of the applications 147 the order of priority for using the system resources (e.g., bus 110, processor 120, memory 130, etc.) of the electronic device 101. For instance, by processing the one or more work requests in accordance with the priority order granted to the at least one of the applications 147, the middleware 143 can perform scheduling, load balancing, etc. for the one or more work requests.

The API 145 is, for example, an interface for enabling the application 147 to control a function of the kernel 141 or the middleware 143. And, the API 145 can, for example, include at least one interface or function (e.g., an instruction) for file control, window control, image processing, character control, etc.

The input output interface 150 can play a role of an interface capable of forwarding a command or data inputted from a user or another external device, to the other constituent element(s) of the electronic device 101. Also, the input output interface 150 can output a command or data received from the other constituent element(s) of the electronic device 101, to the user or external electronic device. In accordance with an exemplary embodiment, the input output interface 150 can include a key pad, a dome switch, a physical button, a touch panel, and/or a jog shuttle.

The display 160 can, for example, include a Liquid Crystal Display (LCD), a Light Emitting Diode (LED) display, an Organic Light Emitting Diode (OLED) display, or a MicroElectroMechanical Systems (MEMS) display, or an electronic paper display. The display 160 can, for example, display various contents (e.g., a text, an image, a video, an icon, a symbol, etc.) to a user. The display 160 can include a touch screen. And, for example, the display 160 can receive a touch, gesture, proximity, or hovering input that uses an electronic pen or a part of the user's body. For instance, the display 160 can combine with a touch panel capable of detecting a touch input or hovering input, to construct one touch screen.

The communication interface 170 can couple communication between the electronic device 101 and an external electronic device (e.g., 1st electronic device 102, 2nd electronic device 104, or server 106). For example, the communication interface 170 can be coupled to a network 162 through wireless communication or wired communication, to communicate with the external electronic device.

The wireless communication, for example, a cellular communication protocol, can use at least one of Long Term Evolution (LTE), LIE-Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), etc., for example. Also, the wireless communication can, for example, include a short-range communication 164. The short-range communication 164 can, for example, include at least one of Wireless Fidelity (WiFi), Bluetooth (BT), Bluetooth Low Energy (BLE), Zigbee, Near Field Communication (NFC), magnetic secure transmission, radio frequency, or a body area network. According to one exemplary embodiment, the wireless communication can include a Global Navigation Satellite System (GNSS). The GNSS can, for example, be a Global Positioning System (GPS), a Global navigation satellite system (Glonass), Beidou (Beidou navigation satellite system), or Galileo (European global satellite-based navigation system). Below, in the present document, the "GPS" can be used interchangeably with the "GNSS".

The wired communication can, for example, include at least one of a Universe Serial Bus (USB), a High Definition Multimedia Interface (HDMI), Recommended Standard-232 (RS-232), Plain Old Telephone Service (POTS), etc. The network 162 can include at least one of a telecommunications network, for example, a computer network (e.g., Local Area Network (LAN) or Wide Area Network (WAN)), the Internet, or a telephone network.

The sensor module 180 can include at least one sensor. For example, the sensor module 180 can include a medical sensor. The medical sensor can sense biometric data, and forward sensing data converting the biometric data into an electrical signal to the processor 120. Here, the sensing data can be raw data sensed by the medical sensor, or data converted in accordance with a specified pocket. For example, the medical sensor can include an E-nose sensor, an Electromyography (EMG) sensor, an Electroencephalogram (EEG) sensor, an Electrocardiogram (ECG) sensor, an InfraRed (IR) sensor, an iris scan sensor, and/or a finger scan sensor. The sensor module 180 is not limited to this, and can include other sensors.

The 1st and 2nd electronic devices 102 and 104 each can be a device of the same or different type from that of the electronic device 101. According to one exemplary embodiment, the server 106 can include a group of one or more servers. According to various exemplary embodiments, all or some of operations executed in the electronic device 101 can be executed in another or a plurality of electronic devices (e.g., electronic devices 102 and 104 or server 106). According to one exemplary embodiment, in case where the electronic device 101 has to perform some function or service automatically or in response to a request, the electronic device 101 can, instead of or additionally to executing the function or service in itself, request at least a partial function associated with this to another device (e.g., electronic device 102, 104 or server 106). The external electronic device (e.g., electronic device 102, 104 or server 106) can execute the requested function or additional function, and forward the execution result to the electronic device 101. The electronic device 101 can process the received result as it is or additionally, to provide the requested function or service. For this, a cloud computing, distributed computing, or client-server computing technology can be used, for example.

Figure 2:
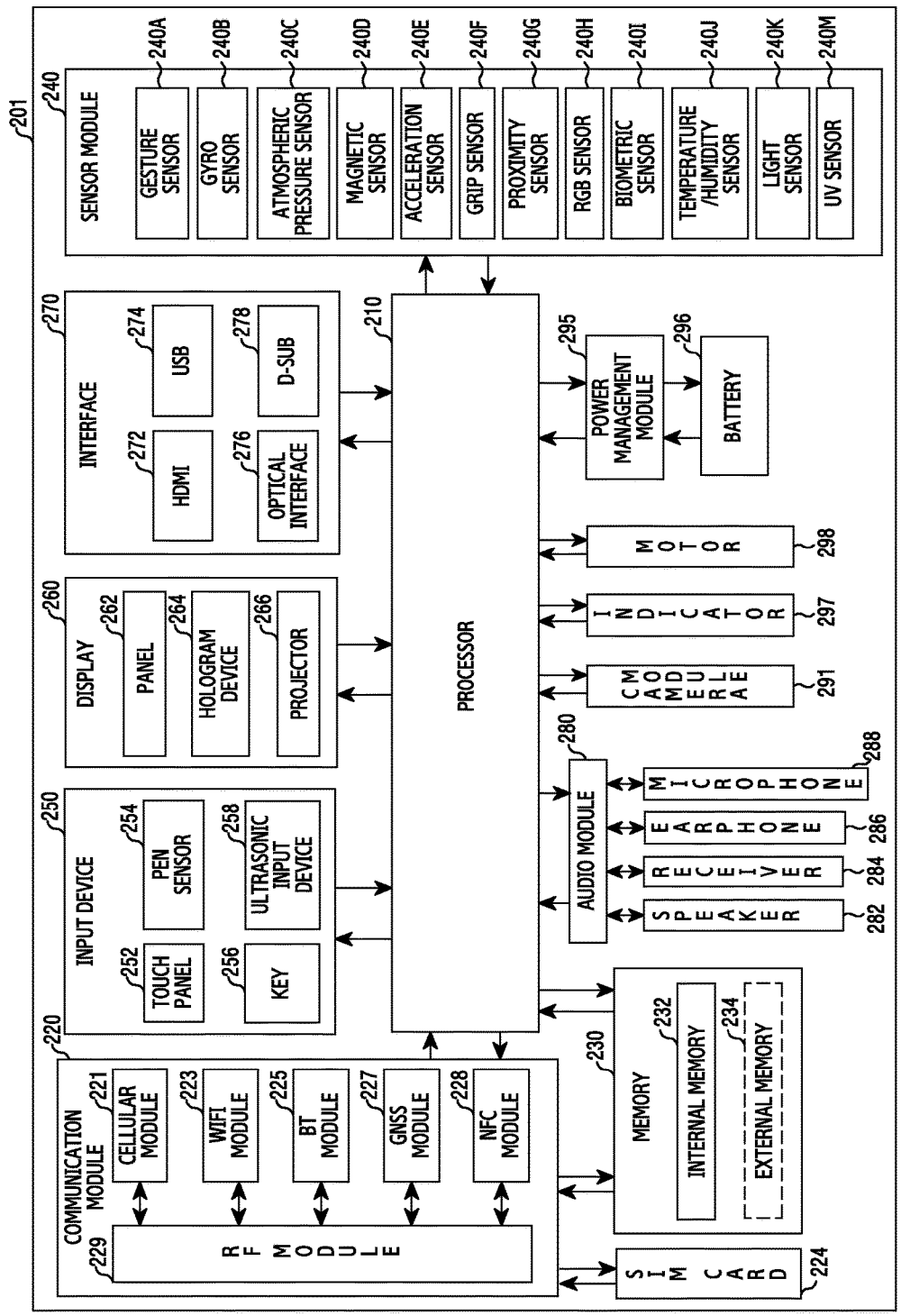
FIG. 2 is a block diagram illustrating an example electronic device according to various example embodiments of the present disclosure.

FIG. 2 is a block diagram illustrating an example electronic device according to various example embodiments of the present disclosure.

FIG. 2 is a block diagram of an electronic device 201 according to various example embodiments. For example, the electronic apparatus 201 may include the whole or part of the electronic apparatus 101 illustrated in FIG. 1. The electronic device 201 may include at least one processor (e.g., Application Processor (AP)) (e.g., including processing circuitry) 210, a communication module (e.g., including communication circuitry) 220, a Subscriber Identification Module (SIM) 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210 may include various processing circuitry and be configured to control a plurality of hardware or software components connected to the processor 210 by driving an operating system or an application program and perform processing of various pieces of data and calculations. The processor 210 may be implemented by, for example, a System on Chip (SoC). According to an embodiment, the processor 210 may further include a Graphic Processing Unit (GPU) and/or an image signal processor. The processor 210 may include at least some (e.g., a cellular module 221) of the elements illustrated in FIG. 2. The processor 210 may load, into a volatile memory, instructions or data received from at least one (e.g., a non-volatile memory) of the other elements and may process the loaded instructions or data, and may store various data in a non-volatile memory.

The communication module 220 may have a configuration equal or similar to that of the communication interface 170 of FIG. 1. The communication module 220 may include various communication circuitry, such as, for example, and without limitation, the cellular module 221, a Wi-Fi module 223, a Bluetooth (BT) module 225, a GNSS module 227 (e.g., a GPS module, a Glonass module, a Beidou module, or a Galileo module), an NFC module 228, and a Radio Frequency (RF) module 229.

The cellular module 221 may provide a voice call, image call, a text message service, or an Internet service through, for example, a communication network. According to an embodiment, the cellular module 221 may distinguish between and authenticate electronic devices 201 within a communication network using a subscriber identification module (for example, the SIM card 224). According to an embodiment of the present disclosure, the cellular module 221 may perform at least some of the functions that the processor 210 may provide. According to an embodiment, the cellular module 221 may include a Communication Processor (CP).

Each of the Wi-Fi module 223, the BT module 225, the GNSS module 227, and the NFC module 228 may include, for example, a processor for processing data transmitted and received through the relevant module. According to some embodiments of the present disclosure, at least some (e.g., two or more) of the cellular module 221, the Wi-Fi module 223, the BT module 225, the GNSS module 227, and the NFC module 228 may be included in one Integrated Chip (IC) or IC package.

The RF module 229 may transmit/receive, for example, a communication signal (for example, an RF signal). The RF module 229 may include, for example, a transceiver, a Power Amplifier Module (PAM), a frequency filter, a Low Noise Amplifier (LNA), and an antenna. According to another embodiment of the present disclosure, at least one of the cellular module 221, the Wi-Fi module 223, the BT module 225, the GNSS module 227, and the NFC module 228 may transmit and receive RF signals through a separate RF module.

The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (for example, the memory 130) may include, for example, an internal memory 232 and/or an external memory 234. The embedded memory 232 may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory or a NOR flash memory), a hard disc drive, a Solid State Drive (SSD), and the like).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a memory stick, or the like. The external memory 234 may be functionally and/or physically connected to the electronic apparatus 201 through various interfaces.

The sensor module 240 may measure a physical quantity or detect an operation state of the electronic device 201, and may convert the measured or detected information into an electrical signal. For example, the sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G a color sensor 240H (for example, a Red/Green/Blue (RGB) sensor), a biometric sensor 240I, a temperature/humidity sensor 240J, a light sensor 240K, and an Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments of the present disclosure, the electronic apparatus 201 may further include a processor configured to control the sensor module 240 as a part of or separately from the processor 210, and may control the sensor module 240 while the processor 210 is in a sleep state.

The input device 250 may include various input circuitry, such as, for example, and without limitation, a touch panel 252, a (digital) pen sensor 254, a key 256, or an ultrasonic input device 258. The touch panel 252 may use at least one of, for example, a capacitive type, a resistive type, an infrared type, and an ultrasonic type. Also, the touch panel 252 may further include a control circuit. The touch panel 252 may further include a tactile layer and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect ultrasonic wavers generated by an input tool through a microphone (for example, a microphone 288) and identify data corresponding to the detected ultrasonic waves.

The display 260 (for example, the display 160) may include a panel 262, a hologram device 264 or a projector 266. The panel 262 may include a configuration that is identical or similar to the display 160 illustrated in FIG. 1. The panel 262 may be implemented to be, for example, flexible, transparent, or wearable. The panel 262 and the touch panel 252 may be implemented as one module. The hologram 264 may show a three dimensional image in the air by using an interference of light. The projector 266 may display an image by projecting light onto a screen. The screen may be located, for example, inside or outside the electronic apparatus 201. According to an embodiment, the display 260 may further include a control circuit for controlling the panel 262, the hologram device 264, or the projector 266.

The interface 270 may include various interface circuitry, such as, for example, and without limitation, a High-Definition Multimedia Interface (HDMI) 272, a Universal Serial Bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280 may bilaterally convert, for example, a sound and an electrical signal. At least some elements of the audio module 280 may be included in, for example, the input/output interface 145 illustrated in FIG. 1. The audio module 280 may process sound information which is input or output through, for example, a speaker 282, a receiver 284, earphones 286, the microphone 288 or the like.

The camera module 291 is a device which may photograph a still image and a dynamic image. According to an embodiment, the camera module 291 may include one or more image sensors (for example, a front sensor or a back sensor), a lens, an Image Signal Processor (ISP) or a flash (for example, LED or xenon lamp).

The power management module 295 may manage, for example, power of the electronic device 201. According to an embodiment, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature during the charging. The battery 296 may include, for example, a rechargeable battery or a solar battery.

The indicator 297 may display a particular state (e.g., a booting state, a message state, a charging state, or the like) of the electronic apparatus 201 or a part (e.g., the processor 210). The motor 298 may convert an electrical signal into mechanical vibration, and may generate vibration, a haptic effect, or the like. Although not illustrated, the electronic apparatus 201 may include a processing unit (e.g., a GPU) for supporting a mobile television (TV). The processing unit for supporting mobile TV may, for example, process media data according to a certain standard such as Digital Multimedia Broadcasting (DMB), Digital Video Broadcasting (DVB), or mediaFLO™.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
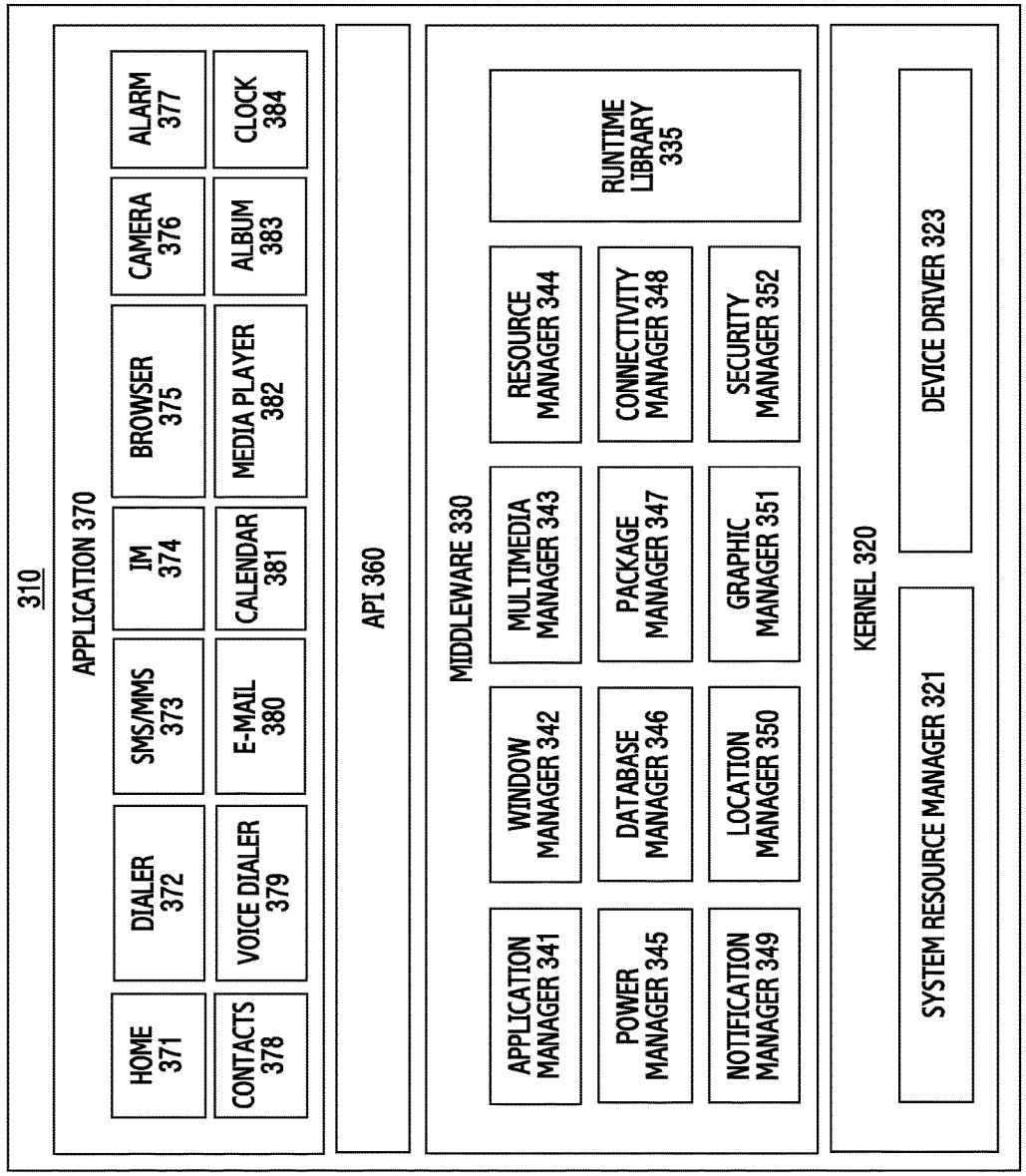
FIG. 3 is a block diagram illustrating an example program module according to various example embodiments of the present disclosure.

FIG. 3 is a block diagram illustrating an example program module according to various example embodiments of the present disclosure.

According to an example embodiment, the program module 310 (for example, the program 140) may include an Operating System (OS) for controlling resources related to the electronic device (for example, the electronic device 101) and/or various applications (for example, the application programs 147) executed in the operating system. The operating system may be, for example, Android, iOS, Windows, Symbian, Tizen, Bada, or the like.

The program module 310 may include a kernel 320, middleware 330, an API 360, and/or an application 370. At least some of the program module 310 may be preloaded on the electronic apparatus, or may be downloaded from an external electronic apparatus (e.g., the electronic apparatus 102 or 104, or the server 106).

The kernel 320 (e.g., the kernel 141) may include, for example, a system resource manager 321 and/or a device driver 323. The system resource manager 321 may perform the control, allocation, retrieval, or the like of system resources. According to an embodiment of the present disclosure, the system resource manager 321 may include a process manager, a memory manager, a file system manager, or the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 330 may provide a function required by the applications 370 in common or provide various functions to the applications 370 through the API 360 so that the applications 370 can efficiently use limited system resources within the electronic device. According to an embodiment, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while the applications 370 are being executed. The runtime library 335 may perform input/output management, memory management, the functionality for an arithmetic function, or the like.

The application manager 341 may manage, for example, the life cycle of at least one of the applications 370. The window manager 342 may manage Graphical User Interface (GUI) resources used for the screen. The multimedia manager 343 may determine a format required to reproduce various media files, and may encode or decode a media file by using a coder/decoder (codec) appropriate for the relevant format. The resource manager 344 may manage resources, such as a source code, a memory, a storage space, and the like of at least one of the applications 370.

The power manager 345 may operate together with a Basic Input/Output System (BIOS) to manage a battery or power and may provide power information required for the operation of the electronic device. The database manager 346 may generate, search for, and/or change a database to be used by at least one of the applications 370. The package manager 347 may manage the installation or update of an application distributed in the form of a package file.

The connectivity manager 348 may manage a wireless connection such as, for example, Wi-Fi or Bluetooth. The notification manager 349 may display or notify of an event, such as an arrival message, an appointment, a proximity notification, and the like, in such a manner as not to disturb the user. The location manager 350 may manage location information of the electronic apparatus. The graphic manager 351 may manage a graphic effect, which is to be provided to the user, or a user interface related to the graphic effect. The security manager 352 may provide various security functions required for system security, user authentication, and the like. According to an embodiment of the present disclosure, when the electronic apparatus (e.g., the electronic apparatus 101) has a telephone call function, the middleware 330 may further include a telephony manager for managing a voice call function or a video call function of the electronic apparatus.

The middleware 330 may include a middleware module that forms a combination of various functions of the above-described elements. The middleware 330 may provide a module specialized for each type of OS in order to provide a differentiated function. Also, the middleware 330 may dynamically delete some of the existing elements, or may add new elements.

The API 360 (e.g., the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 370 (for example, the application program 147) may include, for example, one or more applications which can provide functions such as home 371, dialer 372, SMS/MMS 373, Instant Message (IM) 374, browser 375, camera 376, alarm 377, contacts 378, voice dialer 379, email 380, calendar 381, media player 382, album 383, clock 384, health care (for example, measure exercise quantity or blood sugar), or environment information (for example, atmospheric pressure, humidity, or temperature information).

According to an example embodiment of the present disclosure, the applications 370 may include an application (hereinafter, referred to as an "information exchange application" for convenience of description) supporting information exchange between the electronic apparatus (e.g., the electronic apparatus 101) and an external electronic apparatus (e.g., the electronic apparatus 102 or 104). The application associated with information exchange may include, for example, a notification relay application for forwarding specific information to an external electronic device, or a device management application for managing an external electronic device.

For example, the notification relay application may include a function of delivering, to the external electronic apparatus (e.g., the electronic apparatus 102 or 104), notification information generated by other applications (e.g., an SMS/MMS application, an email application, a health care application, an environmental information application, etc.) of the electronic apparatus 101. Further, the notification relay application may receive notification information from, for example, an external electronic device and provide the received notification information to a user.

The device management application may manage (for example, install, delete, or update), for example, a function for at least a part of the external electronic device (for example, the electronic device 102 or 104) communicating with the electronic device (for example, turning on/off the external electronic device itself (or some elements thereof) or adjusting brightness (or resolution) of a display), applications executed in the external electronic device, or services provided from the external electronic device (for example, a telephone call service or a message service).

According to an embodiment, the applications 370 may include applications (for example, a health care application of a mobile medical appliance or the like) designated according to attributes of the external electronic device 102 or 104. According to an embodiment of the present disclosure, the application 370 may include an application received from the external electronic apparatus (e.g., the server 106, or the electronic apparatus 102 or 104). According to an embodiment of the present disclosure, the application 370 may include a preloaded application or a third party application which can be downloaded from the server. Names of the elements of the program module 310, according to the above-described embodiments of the present disclosure, may change depending on the type of OS.

According to various embodiments of the present disclosure, at least some of the program module 310 may be implemented in software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process for performing one or more functions.

The term "module" as used herein may, for example, refer to a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of a dedicated processor, a CPU, an Application-Specific Integrated Circuit (ASIC) chip, a Field-Programmable Gate Arrays (FPGA), and a programmable-logic device for performing operations which has been known or are to be developed hereinafter.

According to various example embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The aforementioned description has been made for an example in which an electronic device (e.g., electronic device 101 or electronic device 201) can request biometric authentication from an external electronic device (e.g., electronic device 102) and perform authentication, or can perform biometric authentication for authentication of the external electronic device and transmit a biometric authentication response signal to the external electronic device. In various example embodiments described below, for convenience of description, an electronic device performing authentication may be referred to as an "electronic device", and an electronic device transmitting authentication information for authentication of the electronic device may be referred to as an "external electronic device".

Figure 4A:
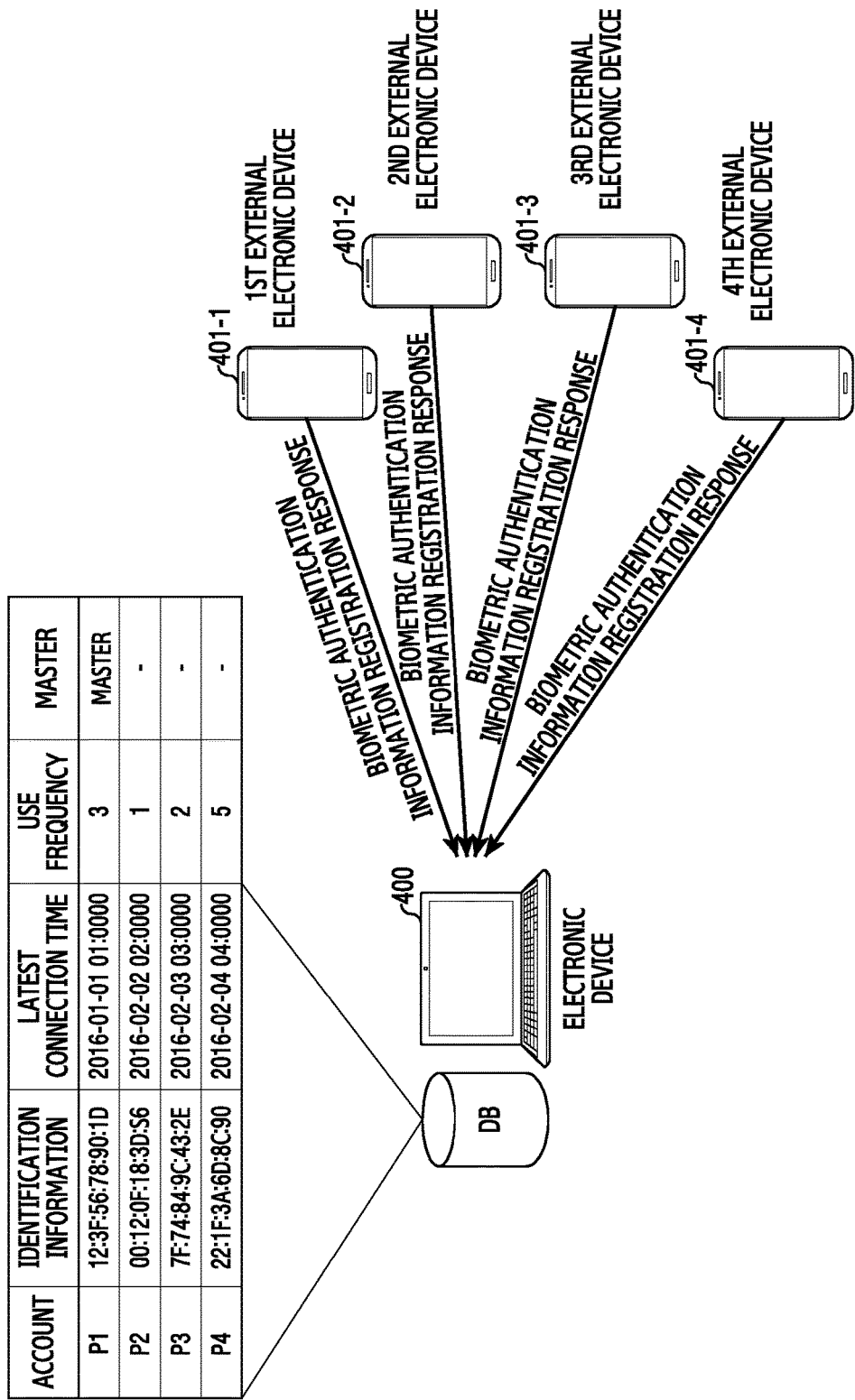
FIG. 4A is a diagram illustrating an example operation of acquiring information of an external electronic device in an electronic device according to various example embodiments of the present disclosure.

FIG. 4A is a diagram illustrating an example operation of acquiring information of an external electronic device in an electronic device according to various example embodiments of the present disclosure. Here, for convenience of description, it is assumed that the electronic device is a Personal Computer (PC), and the external electronic device is a smart phone. However, various example embodiments of the present disclosure are not limited to this. For example, various example embodiments of the present disclosure can be applied to a case where the electronic device and the external electronic device are electronic devices of different types, such as a case where the electronic device is a smart phone and the external electronic device is a wearable device, etc.

As illustrated in FIG. 4A, the electronic device 400 can generate and store a table representing authentication device information by account, using biometric authentication information registration response signals received from 1st to 4th external electronic devices 401-1 to 401-4, a history of account connection using the 1st to 4th external electronic devices 401-1 to 401-4, a user input, or a combination thereof.

According to various example embodiments, the electronic device 400 can receive biometric authentication information registration response signals from a plurality of peripheral external electronic devices 401-1 to 401-4. The biometric authentication information registration response signal can include authentication information (e.g., public key) of a corresponding external electronic device and corresponding external electronic device related information (e.g., identification information, sensor type information, etc.). According to an example embodiment, the electronic device 400 can receive a signal (e.g., response signal for registering biometric authentication information) including identification information (e.g., "MAC address information: 12:3F:56:78:90:1D") of the 1st external electronic device 401-1) together with authentication information about an account "P1", from the 1st external electronic device 401-1, and store the identification information (e.g., MAC address information "12:3F:56:78:90:1D") of an authentication device of the account "P1". According to an example embodiment, the electronic device 400 can receive a signal including identification information (e.g., MAC address information of a corresponding external electronic device) together with authentication information about a corresponding account (e.g., P2, P3, or P4), from each of the 2nd external electronic device 401-2, the 3rd external electronic device 401-3, and the 4th external electronic device 401-4, and store the identification information (e.g., "P2—00:12:

0F:18:3D:S6", "P3—7F:74:84:9C:43:2E", and "P4—22:1F: 3A:6D:8C:90") of authentication devices of respective accounts.

According to various example embodiments, the electronic device 400 can additionally store the latest connection time information and use frequency information about each account, based on an account connection history of the 1st to 4th external electronic devices 401-1 to 401-4. According to an example embodiment, the electronic device 400 can map that the latest time point at which the 1st external electronic device 400-1 connects to the account "P1" is "2016-01-01 01:00:00" and use frequency information "3" representing that the number of connection during the latest three months is 3 times, to "Account: P1" and "MAC address information: 12:3F:56:78:90:1D", and store. According to an example embodiment, the electronic device 400 can map the latest connection time information and use frequency information about a corresponding account, to corresponding account information and identification information, based on a connection history of a corresponding external electronic device, for each of the 2nd external electronic device 401-2, the 3rd external electronic device 401-3, and the 4th external electronic device 401-4, and store the mapping result.

According to an example embodiment, the electronic device 400 can recognize that the 1st external electronic device 401-1 among the 1st to 4th external electronic devices 401-1 to 401-4 is set as a master device by a user input, and map information representing that the 1st external electronic device 401-1 is set as the master device, to "Account: P1" and "MAC address information: 12:3f:56: 78:90:1D", and store the mapping result.

As illustrated in FIG. 4A, the aforementioned information can be registered to a database of the electronic device 400 in a table form. Also, although not illustrated, in a case where other information (e.g., medical sensor type information) is received from the 1st to 4th external electronic devices 401-1 to 401-4, the electronic device 400 can map the received other information to the accounts and the MAC addresses, and store the mapping result.

In the aforementioned example, information about at least one external electronic device is registered as authentication device information about each account, but in accordance with various example embodiments of the present disclosure, information about a plurality of external electronic devices can be registered to one account. This is because several pieces of authentication information can be registered to one account.

Figure 4B:
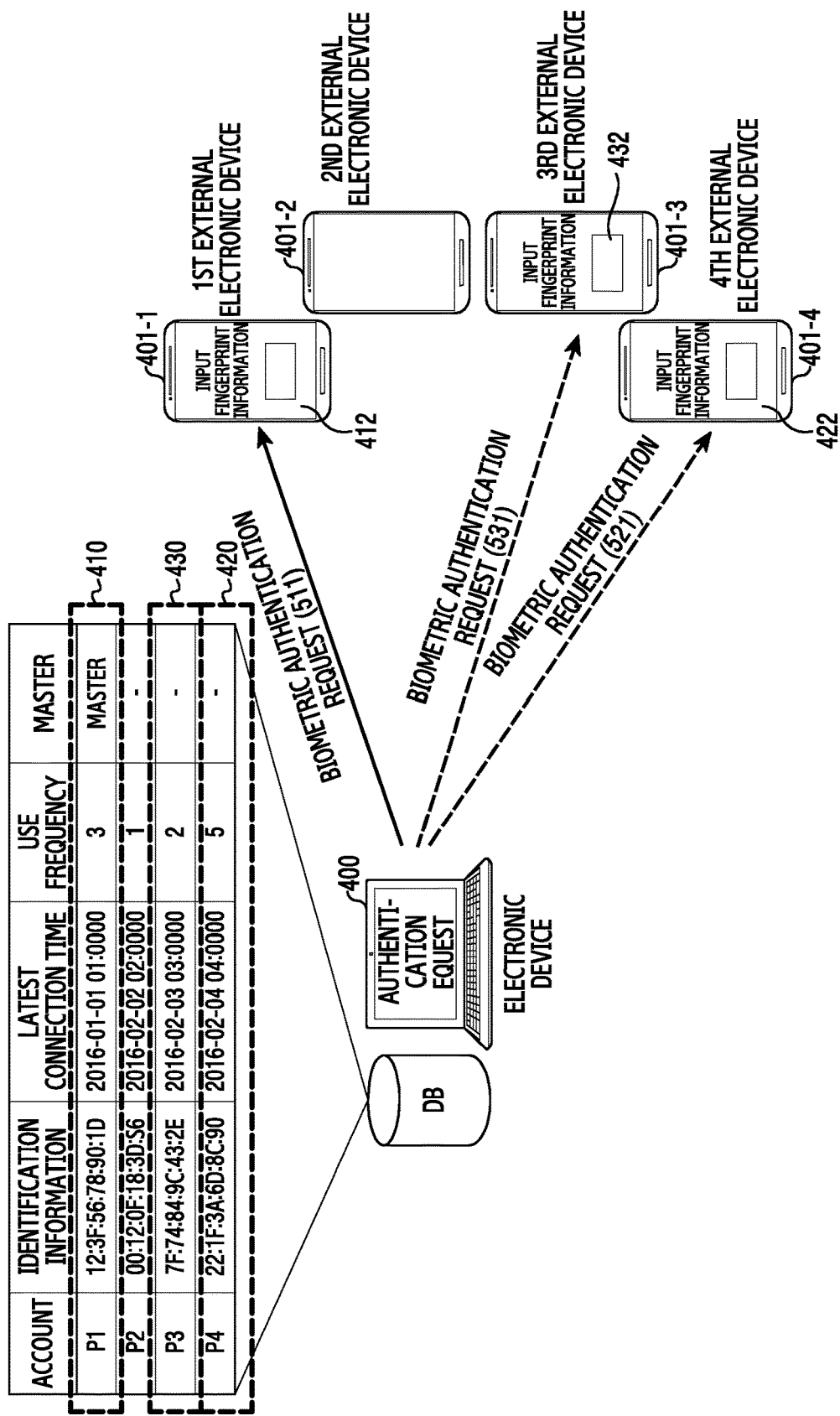
FIG. 4B is a diagram illustrating an example operation of selecting an external electronic device based on pre-registered information in an electronic device according to various example embodiments of the present disclosure.

FIG. 4B is a diagram illustrating an example operation of selecting an external electronic device based on pre-registered information in an electronic device according to various example embodiments of the present disclosure. Here, for convenience of description, it is assumed that the electronic device is a PC, and the external electronic device is a smart phone. However, various example embodiments of the present disclosure are not limited to this. For example, various example embodiments of the present disclosure can be applied to a case where the electronic device and the external electronic device are electronic devices of different types, such as a case where the electronic device is a smart phone and the external electronic device is a wearable device, etc. Also, here, a description is made on the assumption that the electronic device is not aware of information about an account at which an authentication request event is sensed.

Referring to FIG. 4B, the electronic device 400 can include a table representing authentication device information by account as illustrated in FIG. 4A.

As illustrated in FIG. 4B, in a case where an authentication request event is sensed and the electronic device 400 is not aware of an account at which the authentication request event occurs, the electronic device 400 can determine all external electronic devices included in a previously stored table, as candidate external electronic devices. The electronic device 400 can select (410) an external electronic device that is set as a master device, in the previously stored table, and check MAC address information of the selected external electronic device, and request biometric authentication to the 1st external electronic device 401-1, using the checked MAC address information. For example, the electronic device 400 can couple short-range communication with the 1st external electronic device 401-1 and then, transmit a signal requesting biometric authentication to the 1st external electronic device 401-1 (511). The 1st external electronic device 401-1 receiving the signal requesting the biometric authentication (511) can display a screen 412 requesting an input of fingerprint information that is biometric data.

In accordance with an example embodiment, the electronic device 400 can sense that the short-range communication coupling with the 1st external electronic device 401-1 fails, or sense that the authentication fails based on a biometric authentication response signal received from the 1st external electronic device 401-1, or sense that a failure message is received from the 1st external electronic device 401-1. The electronic device 400 can select (420) an external electronic device whose latest connection time information is closest to a current time point, among the remaining authentication devices except for the authentication-failed external electronic device (e.g., 1st external electronic device 401-1), in the previously stored table. The electronic device 400 can check MAC address information of the selected authentication device 420, and request biometric authentication to the 4th external electronic device 401-4, using the checked MAC address information. For example, the electronic device 400 can couple short-range communication with the 4th external electronic device 401-4 and then, request biometric authentication to the 4th external electronic device 401-4 (521). The 4th external electronic device 401-4 receiving a biometric authentication request signal (521) can display a screen 422 requesting an input of fingerprint information that is biometric data.

In accordance with an example embodiment, the electronic device 400 can sense that the short-range communication coupling with the 4th external electronic device 401-4 fails, or sense that the authentication fails based on a biometric authentication response signal received from the 4th external electronic device 401-4, or sense that a failure message is received from the 1st external electronic device 401-4. At this time, the electronic device 400 can select (430) an external electronic device whose use frequency is highest, among the remaining external electronic devices except for the authentication-failed external electronic devices (e.g., 1st and 4th external electronic device 401-1 and 401-4), in the previously stored table. The electronic device 400 can check MAC address information of the selected external electronic device, and request biometric authentication to the 3rd external electronic device 401-3, using the checked MAC address information. For example, the electronic device 400 can couple short-range communication with the 3rd external electronic device 401-3 and then, request biometric authentication to the 3rd external electronic device 401-3 (531). The 3rd external electronic device 401-3 receiving a biometric authentication request signal (531) can display a screen 432 requesting an input of fingerprint information that is biometric data.

In accordance with an example embodiment, the electronic device 400 can sense that the short-range communication coupling with the 4th external electronic device 401-4 fails, or sense that the authentication fails based on a biometric authentication response signal received from the 4th external electronic device 401-4, or sense that a failure message is received from the 1st external electronic device 401-1. At this time, the electronic device 400 can select the remaining external electronic device except for the authentication-failed external electronic devices (e.g., 1st, 3rd, and 4th external electronic devices 401-1, 401-3, and 401-4) in the previously stored table, and request biometric authentication to the 2nd external electronic device 401-2, using MAC address information of the selected external electronic device. Here, in a case where the remaining external electronic device except for the authentication-failed external electronic device is plural in number, the electronic device 400 can sequentially or arbitrarily select one external electronic device among a plurality of remaining external electronic devices, and request biometric authentication to the selected external electronic device.

In the aforementioned example, the electronic device selects an external electronic device for authentication request in order of master device, latest connection time information, and use frequency. But, according to various example embodiments of the present disclosure, the order of use of information that the electronic device uses for external electronic device selection can be changed. For example, the electronic device can select at least one external electronic device in most preferential consideration of the latest connection time information. In a case where there is a failure of authentication on the at least one external electronic device that is selected using the latest connection time information, the electronic device can select at least one external electronic device in consideration of a master device, among the remaining external electronic devices except for the authentication-failed at least one external electronic device. Also, in a case where there is a failure of authentication on the at least one external electronic device that is selected in consideration of the master device, the electronic device can select at least one external electronic device in consideration of use frequency, among the remaining external electronic devices except for the authentication-failed external electronic devices.

According to various example embodiments of the present disclosure mentioned above, an electronic device can include a memory for storing biometric authentication information about one or more external electronic devices and one or more identification information corresponding to the one or more external electronic devices, the one or more external electronic devices including sensors for acquiring biometric data corresponding to the biometric authentication information, and a processor. The processor can be configured to receive a request related to authentication, to select at least one external electronic device among the one or more external electronic devices for the authentication, to transmit a request for authentication to the at least one external electronic device, using at least one identification information corresponding to the at least one external electronic device among the identification information, and to perform the authentication, based at least on authentication information received from the at least one external electronic device and the biometric authentication information.

According to various example embodiments, the processor can be configured to determine one or more external electronic devices corresponding to accounts for performing the authentication among the one or more external electronic devices, and select the at least one external electronic device among the determined one or more external electronic devices.

According to various example embodiments, the processor can be configured to determine one or more external electronic devices whose short-range communication coupling is available among the one or more external electronic devices, and select the at least one external electronic device among the determined one or more external electronic devices.

According to various example embodiments, the processor can be configured to attempt short-range communication coupling with the selected at least one external electronic device and, where the short-range communication coupling fails, select a previously non-selected external electronic device among the one or more external electronic devices as the at least one external electronic device, based on information that is registered to an account to perform the authentication.

According to various example embodiments, the processor can be configured to, in a case where the authentication information is not received from the selected at least one external electronic device, to select a previously non-selected another at least one external electronic device among the one or more external electronic devices, based on information that is registered to an account to perform the authentication, and to transmit a request for the authentication to the another at least one external electronic device, using at least one identification information corresponding to the another at least one external electronic device.

According to various example embodiments, the processor can be configured to, in a case where it is determined that the authentication fails based at least on the comparison, select a previously non-selected another at least one external electronic device among the one or more external electronic devices, based on information that is registered to an account to perform the authentication, and to perform the authentication based on authentication information received from the another at least one external electronic device, using at least one identification information corresponding to the another at least one external electronic device.

According to various example embodiments, in a case where information registered to an account to perform the authentication satisfies a designated condition before the selecting operation, the processor can be configured to perform the selecting operation, using the registered information.

According to various example embodiments, in a case where the registered information satisfies another designated condition, the processor can be configured to perform the selecting operation based on a designated order.

According to various example embodiments, the registered information can include the latest time information at which an external electronic device connects to the electronic device, a frequency at which the external electronic device connects to the electronic device, information representing whether the external electronic device is a master device, sensor type information of the external electronic device, or a combination thereof.

According to various example embodiments, the processor can be configured to perform the operations of determining the order of priority of the one or more external electronic devices through the registered information and selecting the at least one external electronic device based on the priority order.

Figure 5:
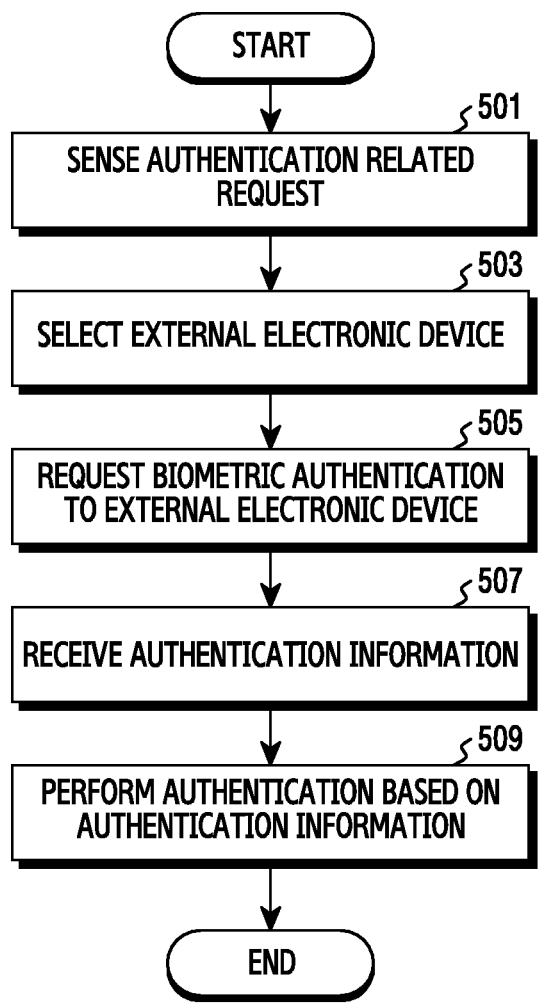
FIG. 5 is a flowchart illustrating an example of performing authentication in an electronic device according to various example embodiments of the present disclosure.

FIG. 5 is a flowchart illustrating an example of performing authentication in an electronic device according to various example embodiments of the present disclosure. In example embodiments below, respective operations can be performed in sequence as well, but are not necessarily performed in sequence. For example, the order of respective operations can be changed as well, and at least two operations can be performed in parallel as well. Here, the electronic device can be the electronic device 101 of FIG. 1.

Referring to FIG. 5, in operation 501, the electronic device can sense an authentication related request. For example, the electronic device can sense that an authentication request event occurs by an input of a user or a request of an external electronic device. The authentication request event can be, for example, an event for connecting to an account, an event for performing a specific function needing authentication in a state of connecting to an account, etc.

In operation 503, the electronic device can select an external electronic device for requesting authentication. For example, the electronic device can select one external electronic device for requesting authentication, among external electronic devices that have been previously registered to the memory 130 as authentication devices. The electronic device can select one external electronic device for requesting authentication, based on information of external electronic devices that have been previously registered to the memory 130 as authentication devices. For example, the electronic device can select an external electronic device for authentication request, based on the number of external electronic devices previously registered to the memory 130, external electronic device related information, additional information, or a combination thereof. The external electronic device related information can be, for example, identification information and/or sensor type information. This can be acquired based a signal received from the external electronic device. The additional information can, for example, include account information, information representing a master device or not, the latest connection time information, use frequency information, or a combination thereof. This can be acquired based on a connection history of the external electronic device, or can be acquired by a user input.

In operation 505, the electronic device can request biometric authentication to the selected external electronic device. For example, the electronic device can perform communication coupling (e.g., short-range communication) with the selected external electronic device, and transmit a biometric authentication request signal to the external electronic device based on a coupled communication scheme. In accordance with an example embodiment, the electronic device can encrypt random data using previously stored authentication information (e.g., public key), and transmit a biometric authentication request signal including the encrypted random data to the external electronic device.

In operation 507, the electronic device can receive authentication information from the selected external electronic device. For example, in response to the biometric authentication request signal, the electronic device can receive a biometric authentication response signal from the selected external electronic device based on the coupled communication scheme (e.g., short-range communication). In accordance with an example embodiment, the biometric authentication response signal can include random data and the authentication information of the external electronic device. The authentication information can be generated based on identification information (e.g., ID and/or MAC address) of the external electronic device.

In operation 509, the electronic device can perform authentication, based on the received authentication information and previously stored biometric authentication information. In accordance with an example embodiment, the electronic device can determine authentication success or non-success, based on the authentication information and the random data that are included in the biometric authentication response signal.

In accordance with an example embodiment, in a case where the authentication information included in the biometric authentication response signal and the previously registered biometric authentication information are the same as each other, and the random data included in the biometric authentication response signal and random data that the electronic device transmits as including in the biometric authentication request signal are the same as each other, the electronic device can determine that authentication on an account corresponding to the corresponding biometric authentication information succeeds.

According to an example embodiment, in a case where the random data included in the biometric authentication response signal and the random data that the electronic device transmits as including in the biometric authentication request signal are the same as each other, and the external electronic device having transmitted the biometric authentication response signal and an external electronic device registered as an authentication device of an account at which a biometric authentication event occurs are the same as each other, the electronic device can determine that the authentication on the account corresponding to the corresponding biometric authentication information succeeds.

In accordance with an example embodiment, in a case where the authentication succeeds, the electronic device can perform an instruction according to the authentication success. For example, the electronic device can display information notifying that the authentication has succeeded on a screen, or provide sound through a speaker. In addition, the electronic device can grant connection to a corresponding account. Or, the electronic device can perform a preset specific function that should be carried out at authentication success.

In a case where the authentication fails, the electronic device can perform an instruction according to the authentication failure. For example, the electronic device can display information notifying that the authentication has failed on a screen, and prohibit connection to a corresponding account. Or, the electronic device can perform a preset specific function that should be carried out at authentication failure.

Figure 6:
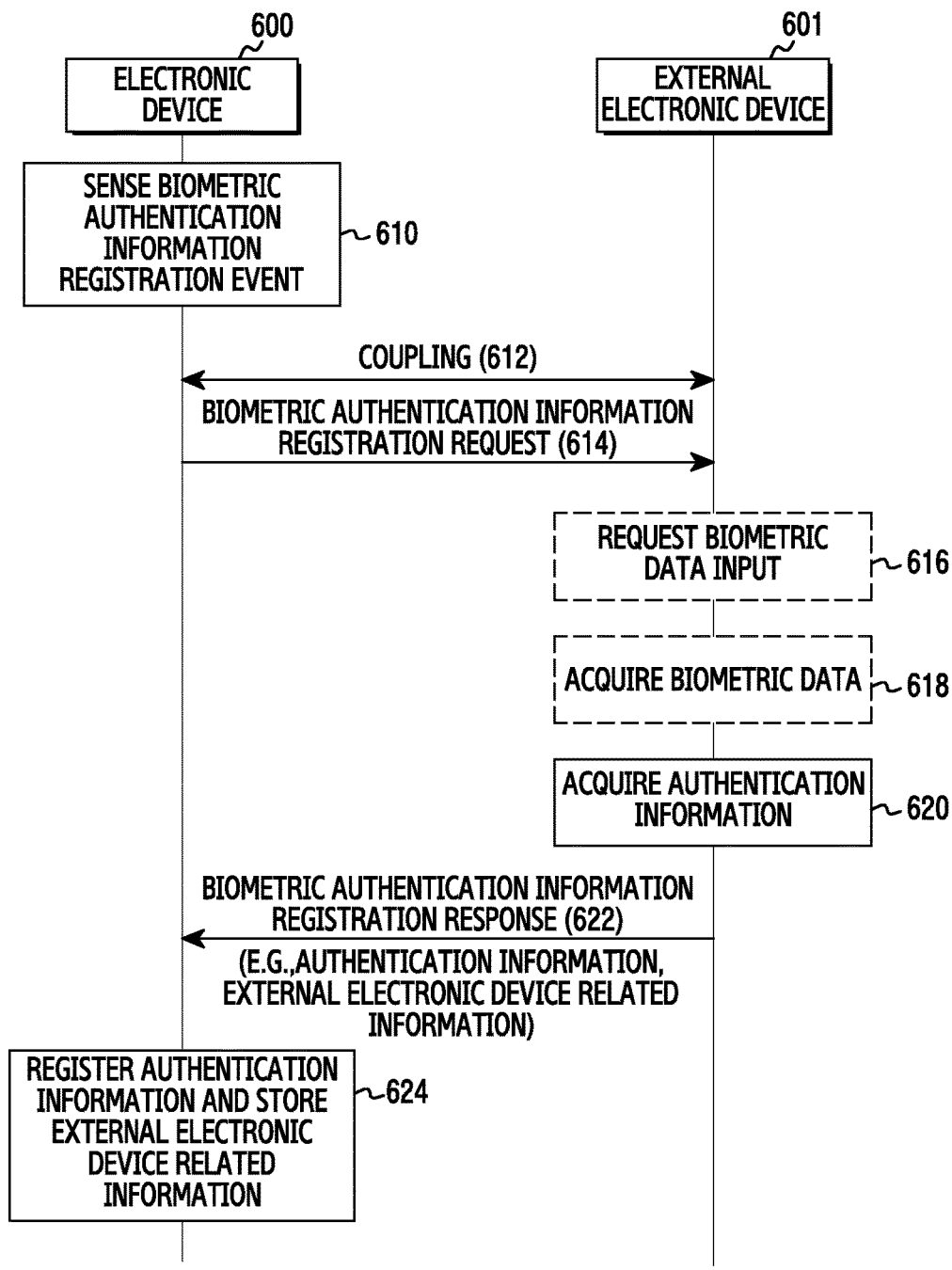
FIG. 6 is a ladder diagram illustrating an example of registering biometric authentication information and information of an external electronic device in an electronic device and the external electronic device according to various example embodiments of the present disclosure.

FIG. 6 is a ladder diagram illustrating an example of registering biometric authentication information and information of an external electronic device in an electronic device and the external electronic device according to various example embodiments of the present disclosure. In various example embodiments below, respective operations can be performed in sequence as well, but are not necessarily performed in sequence. For example, the order of respective operations can be changed as well, and at least two operations can be performed in parallel as well. According to an example embodiment, the electronic device 600 can be the electronic device 101 of FIG. 1, and the external electronic device 601 can be the external electronic device 102 of FIG. 1. According to an example embodiment, the electronic device 600 can be the external electronic device 102 of FIG.

1, and the external electronic device 701 can be the electronic device 101 of FIG. 1. In FIG. 6, block operations shown in dotted lines can be omitted in accordance with an example embodiment.

Referring to FIG. 6, in operation 610, the electronic device 600 can sense a biometric authentication information registration event. For example, the electronic device 600 can sense the biometric authentication information registration event for a specific account by a user input or a request of an external electronic device. For example, in a case where it is sensed that a menu item for biometric authentication information registration is selected by a user input in a state of connecting (e.g., log-in) to the specific account, the electronic device 600 can sense that the biometric authentication information registration event has occurred. Or, in a case where a signal for triggering the biometric authentication information registration event is received from the external electronic device 601 in the state of connecting to the specific account, the electronic device 600 can sense that the biometric authentication information registration event has occurred.

In operation 612, the electronic device 600 can perform communication coupling with the external electronic device 601. For example, in response to that the biometric authentication information registration event is sensed, the electronic device 600 can search an external electronic device whose communication coupling (e.g., short-range communication coupling) is available, and perform communication coupling with the searched external electronic device. To search the external electronic device whose communication coupling is available, the electronic device 600 can broadcast a search request signal, using a communication protocol (e.g., short-range communication protocol). The electronic device 600 can receive response signals responsive to the search request signals, and determine external electronic devices having transmitted the response signals, as the external electronic devices whose communication coupling is available. The electronic device 600 can select one external electronic device among the external electronic devices whose communication coupling is available, and perform communication coupling with the selected external electronic device.

In operation 614, the electronic device 600 can transmit a biometric authentication information registration request signal to the communication-coupled external electronic device 601. For example, the electronic device 600 can transmit the biometric authentication information registration request signal to the external electronic device 601, using a coupled communication scheme.

In operation 616, the external electronic device 601 receiving the biometric authentication information registration request signal can request a biometric data input. For example, after driving a medical sensor, the external electronic device 601 can display a user interface requesting the biometric data input.

In operation 618, the external electronic device 601 can acquire biometric data. For example, the external electronic device 601 can sense user's biometric data through the driven medical sensor, and acquire sensing data converting the sensed biometric data into an electrical signal, and store the acquired sensing data.

In operation 620, the external electronic device 601 can acquire authentication information. According to an example embodiment, the external electronic device 601 can acquire the authentication information, by generating the authentication information based on identification information (e.g., ID and/or MAC address) of the external electronic device. The authentication information can include an encryption key pair (e.g., public key and private key). The external electronic device 601 can store the acquired authentication information and the biometric data, together. According to an example embodiment, the external electronic device 601 can omit operation 616 and operation 618, and acquire authentication information previously stored in the memory 130.

In operation 622, the external electronic device 601 can transmit a biometric authentication information registration response signal to the electronic device 600. According to an example embodiment, the biometric authentication information registration response signal can include the authentication information (e.g., public key) acquired in operation 620 and information related to the external electronic device 601. For example, the external electronic device 601 can transmit the biometric authentication information registration response signal including the public key, to the external electronic device. The information related to the external electronic device 601 can, for example, include identification information of the external electronic device 601, and/or type information of the medical sensor that the external electronic device 601 possesses. According to an example embodiment, in a case where previously stored biometric data and authentication information do not exist, and the biometric data is not acquired through the medical sensor in operation 618, the biometric authentication information registration response signal can include information representing a biometric authentication information registration failure.

In operation 624, the electronic device 600 receiving the biometric authentication information registration response signal can register the authentication information, and store the information related to the external electronic device 601. For example, the electronic device 600 can register the authentication information, as biometric authentication information about an account at which the biometric authentication information registration event is sensed. Also, the electronic device 600 can store the information related to the external electronic device 601, as information of an authentication device of the account at which the authentication information registration event is sensed.

Figure 7:
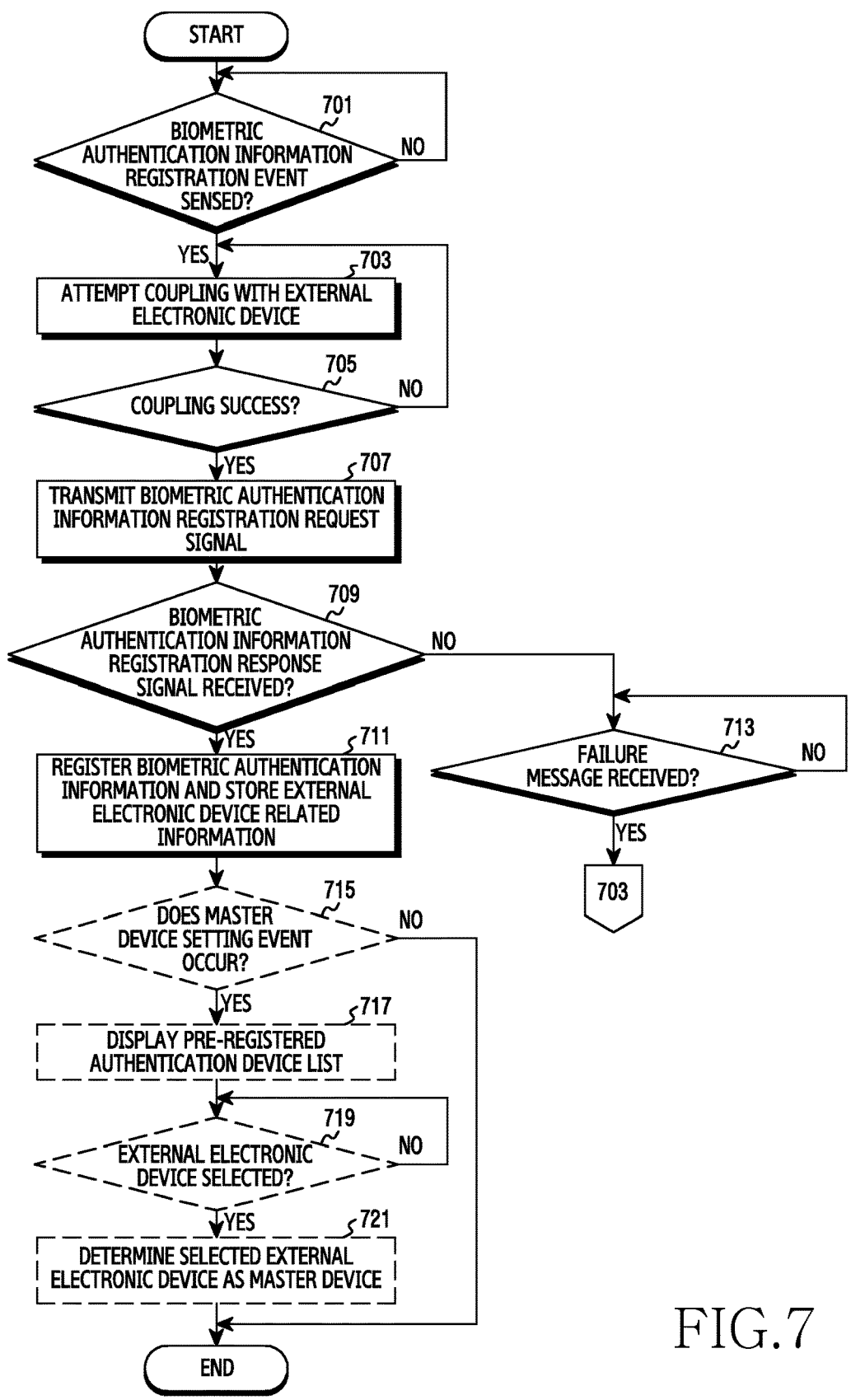
FIG. 7 is a flowchart illustrating an example of registering biometric authentication information and information of an external electronic device in an electronic device according to various example embodiments of the present disclosure.

FIG. 7 is a flowchart illustrating an example of registering biometric authentication information and information of an external electronic device in an electronic device according to various example embodiments of the present disclosure. FIG. 7 is a flowchart illustrating in more detail the operation of the electronic device illustrated in FIG. 6. In example embodiments below, respective operations can be performed in sequence as well, but are not necessarily performed in sequence. For example, the order of respective operations can be changed as well, and at least two operations can be performed in parallel as well. In FIG. 7, block operations shown in dotted lines can be omitted in accordance with an example embodiment. Here, the electronic device can be the electronic device 101 of FIG. 1 and/or the electronic device 600 of FIG. 6. And, the external electronic device can be the external electronic device 102 of FIG. 1 and/or the external electronic device 601 of FIG. 6.

Referring to FIG. 7, in operation 701, the electronic device can sense a biometric authentication information registration event. For example, in a case where it is sensed that a biometric authentication information registration request item displayed on a screen is selected by a user input in a state of connecting (e.g., log-in) to a specific account, the electronic device can sense that the event for registering biometric authentication information has occurred. Or, in a case where a signal requesting biometric authentication information registration to the specific account is received from the external electronic device, the electronic device can sense that the event for registering the biometric authentication information has occurred.

In operation 703, the electronic device can attempt coupling with the external electronic device. For example, the electronic device can search an external electronic device whose communication coupling (e.g., short-range communication coupling) is available, and attempt communication coupling with the searched external electronic device. The electronic device can search the external electronic device whose communication coupling is available, by broadcasting a search request signal based on a communication protocol (e.g., short-range communication protocol), and receiving a response signal responsive to the search request signal from at least one external electronic device.

According to an example embodiment, the electronic device can display on a screen a list of external electronic devices that are searched as communication coupling is available, and select one external electronic device for communication coupling among the external electronic devices within the list, based on a user input. According to an example embodiment, the electronic device can sequentially or arbitrarily select one external electronic device among the external electronic devices that are searched as communication coupling is available. The electronic device can attempt communication coupling, by transmitting a communication coupling (e.g., short-range communication coupling) request signal to the selected external electronic device. The short-range communication coupling can be, for example, Bluetooth coupling. However, various example embodiments of the present disclosure are not limited to this.

In operation 705, the electronic device can determine if the communication coupling with the external electronic device has succeeded. For example, the electronic device can determine if a communication coupling response signal accepting the communication coupling (e.g., short-range communication coupling) has received from the external electronic device. If the communication coupling response signal accepting the communication coupling is received, the electronic device can determine that the communication coupling succeeds. On the other hand, in a case where the communication coupling response signal accepting the communication coupling is not received, the electronic device can determine that the communication coupling fails, and return to operation 703 and attempt communication coupling with another external electronic device.

In a case where the communication coupling succeeds, in operation 707, the electronic device can transmit a biometric authentication information registration request signal to the communication-coupled external electronic device. For example, the electronic device can transmit a signal requesting biometric authentication information registration to the communication-coupled external electronic device, using a coupled communication scheme (e.g., short-range communication scheme).

In operation 709, the electronic device can determine if a biometric authentication information registration response signal is received. For example, the electronic device can determine if the biometric authentication information registration response signal including authentication information is received from the communication-coupled external electronic device within a preset time.

In a case where the biometric authentication information registration response signal is not received from the external electronic device, in operation 709, the electronic device can determine if a failure message is received. For example, the electronic device can determine if a message representing that biometric authentication information registration has failed is received from the communication-coupled external electronic device. The message representing that the biometric authentication information registration has failed can be received in a case where the external electronic device fails in recognizing user's biometric data. In a case where the failure message is received, the electronic device can return to operation 703 and attempt communication coupling with another external electronic device.

In a case where the biometric authentication information registration response signal is received from the external electronic device, in operation 711, the electronic device can register biometric authentication information based on the biometric authentication information registration response signal, and store external electronic device related information.

For example, the electronic device can acquire the authentication information from the biometric authentication information registration response signal, and register the acquired authentication information (e.g., public key) as biometric authentication information about a corresponding account. For example, the electronic device can register the public key received from the external electronic device, as the biometric authentication information about the corresponding account. Also, the electronic device can acquire the external electronic device related information from the biometric authentication information registration response signal, and store and/or register the acquired external electronic device related information as information of an authentication device of the corresponding account. The external electronic device related information can, for example, include identification information of the external electronic device, and medical sensor type information of the external electronic device. Also, according to various example embodiments of the present disclosure, the external electronic device related information is not limited to this, and can include other information related with the external electronic device.

In operation 715, the electronic device can determine if a master device setting event occurs. For example, in a case where a specific application for master device setting is executed, the electronic device can determine that the master device setting event occurs.

Figure 8:
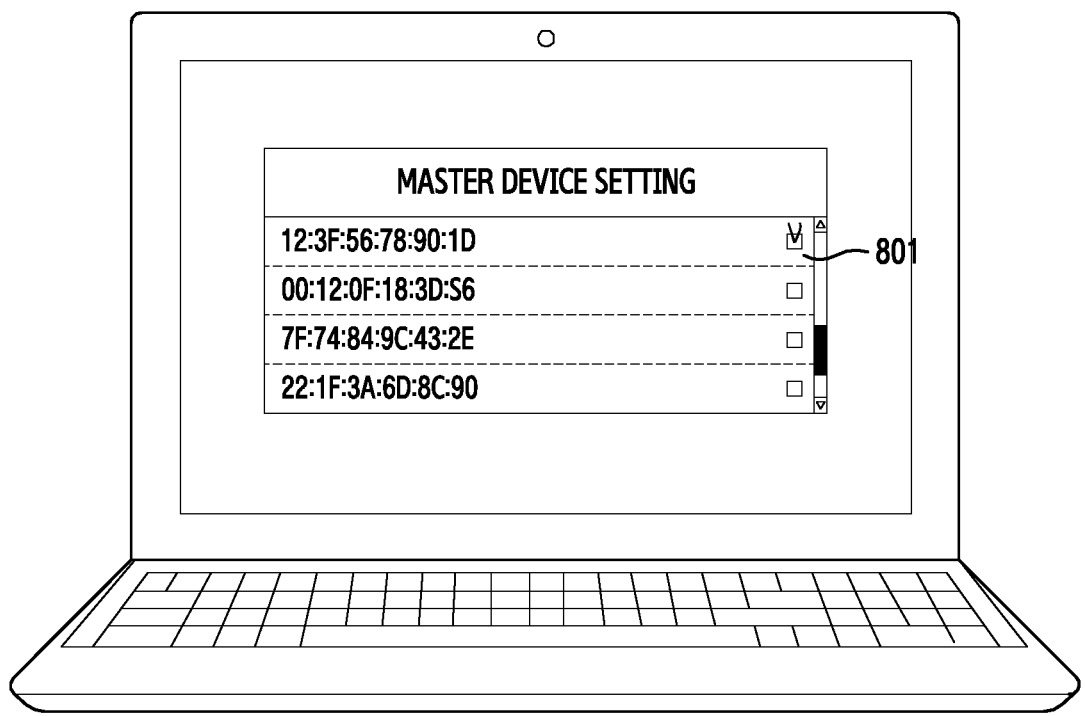
FIG. 8 is a diagram illustrating an example screen for setting a master device in an electronic device according to various example embodiments of the present disclosure.

In operation 717, the electronic device can display a pre-registered authentication device list. For example, the electronic device can generate an authentication device list, using information of an authentication device of each account that has been previously registered to the electronic device, and display the generated authentication device list. The authentication device list can include identification information (e.g., MAC address) of the external electronic device that has been registered as the authentication device of each account. For example, as illustrated in FIG. 8, the electronic device can display the authentication device list, using MAC addresses of external electronic devices that have been registered as authentication devices of respective accounts.

In operation 719, the electronic device can check if an external electronic device is selected from the authentication device list representing the external electronic devices that have been registered as the authentication devices of the accounts. For example, the electronic device can check if one external electronic device is selected by a user input among the external electronic devices included in the authentication device list.

In a case where one external electronic device is selected, in operation 721, the electronic device can determine the selected external electronic device as a master device. The electronic device can store additional information representing that the external electronic device is determined as the master device. For example, the electronic device can add information representing which device is the master device, to the information of the previously registered authentication device of each account. For example, in a case where it is sensed that the external electronic device whose MAC address is "12:3F:56:78:90:1D" is selected (801) as illustrated in FIG. 8, the electronic device can add information representing that the external electronic device whose MAC address is "12:3F:56:78:90:1D" is the master device, as in the table illustrated in FIG. 5A.

Figure 9:
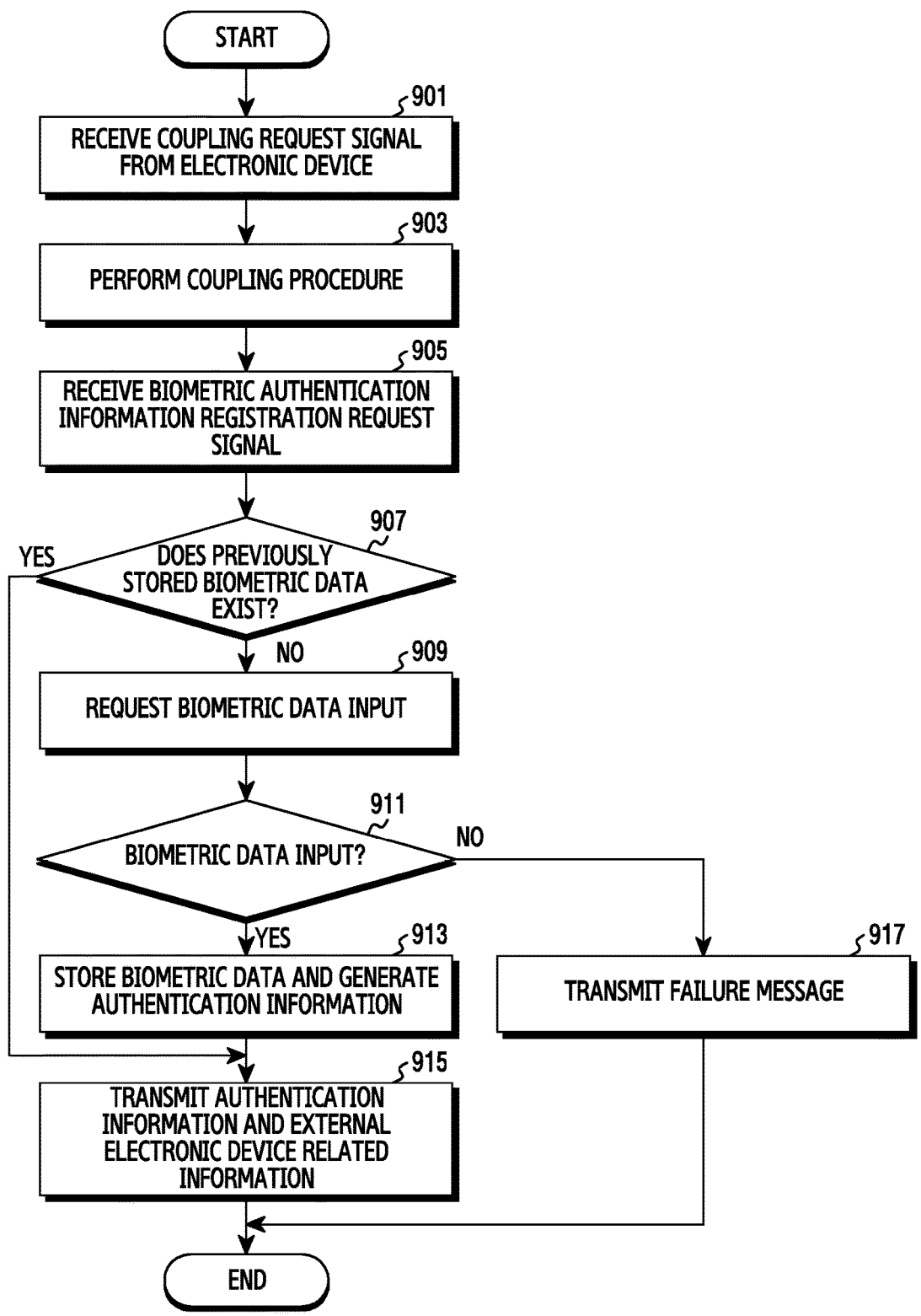
FIG. 9 is a flowchart illustrating an example of registering biometric authentication information and information of an external electronic device to an electronic device in the external electronic device according to various example embodiments of the present disclosure

FIG. 9 is a flowchart illustrating an example of registering biometric authentication information and information of an external electronic device to an electronic device in the external electronic device according to various example embodiments of the present disclosure. FIG. 9 is a flowchart illustrating in more detail the operation of the external electronic device illustrated in FIG. 6. In example embodiments below, respective operations can be performed in sequence as well, but are not necessarily performed in sequence. For example, the order of respective operations can be changed as well, and at least two operations can be performed in parallel as well. Here, the electronic device can be the electronic device 101 of FIG. 1 and/or the electronic device 600 of FIG. 6. And, the external electronic device can be the external electronic device 102 of FIG. 1 and/or the external electronic device 601 of FIG. 6.

Referring to FIG. 9, in operation 901, the external electronic device can receive a coupling request signal from the electronic device. For example, the external electronic device can receive a signal requesting communication coupling (e.g., short-range communication coupling) from the electronic device. For example, the external electronic device can receive a Bluetooth coupling request signal from the electronic device.

In operation 903, the external electronic device can perform a coupling procedure with the electronic device. For example, the external electronic device can transmit a coupling response signal accepting the communication coupling, to the electronic device. The external electronic device can sense that the short-range communication coupling is accepted by a user input or by state information of the external electronic device, and transmit a response signal accepting the communication coupling to the electronic device. In accordance with an example embodiment, the external electronic device can determine the acceptance or non-acceptance of the short-range communication coupling with the external electronic device by a user input. For example, the external electronic device can display information representing that the short-range communication coupling has been requested from the electronic device, on a screen, and display a screen requesting a user to determine short-range communication coupling or non-coupling. In accordance with an example embodiment, the external electronic device can determine the acceptance or non-acceptance of the short-range communication coupling with the electronic device, without the user input. For example, the external electronic device can determine the acceptance or non-acceptance of the short-range communication coupling with the electronic device, based on state information (e.g., battery level, short-range communication coupling function On/Off state, etc.) of the external electronic device.

In operation 905, the external electronic device can receive a biometric authentication information registration request signal from the electronic device. For example, the external electronic device can receive a signal requesting biometric authentication information registration from the short-range communication coupled electronic device, using a short-range communication.

In operation 907, the external electronic device can check if pre-stored biometric data exists. For example, the external electronic device can check if the biometric data that is pre-stored in the memory 130 exists. For another example, the external electronic device can check if the biometric data and authentication information that are pre-stored in the memory 130 exist.

In a case where the pre-stored biometric data does not exist, in operation 909, the external electronic device can request a biometric data input. For example, in a case where a biometric authentication information registration request signal is received, the external electronic device can display a screen requesting the biometric data input to a user so as to acquire biometric data. At this time, the external electronic device can drive a medical sensor for the sake of biometric data recognition. In accordance with an example embodiment, the screen requesting the biometric data input can include information about an account to which the corresponding biometric data will be registered. For example, the external electronic device can display the screen requesting the user to input the fingerprint, so as to register fingerprint information to an account.

In operation 911, the external electronic device can determine if the biometric data is input. For example, the external electronic device can determine if the biometric data is sensed through a driven medical sensor within a preset time. In a case where the biomedical data is sensed through the driven medical sensor, the external electronic device can determine that the biomedical data is inputted. And, in a case where the biometric data is not sensed through the driven medical sensor, the external electronic device can determine that the biometric data is not input.

For example, in a case where the driven medical sensor is a finger scan sensor, the external electronic device can determine if fingerprint information is sensed through the finger scan sensor within a preset time. If a user's finger contact (or touch) is sensed on a fingerprint input region displayed on a screen, the external electronic device can sense information about the user's fingerprint through the finger scan sensor, and determine that the biometric data is inputted. In contrast, in a case where the user's finger contact (or touch) is not sensed on the fingerprint input region displayed on the screen, because the external electronic device cannot acquire the information about the user's fingerprint, the external electronic device can determine that the biometric data is not inputted.

If the biometric data is not input, in operation 917, the external electronic device can transmit a failure message. For example, the external electronic device can transmit a failure message representing that it has failed in the biometric data acquisition, to the electronic device.

If the biometric data is input, in operation 913, the external electronic device can store the biometric data, and generate authentication information for biometric authentication. For example, the external electronic device can store the biometric data that is acquired by sensing through the medical sensor, and generate the authentication information based on identification information (e.g., ID, MAC address, etc.) of the external electronic device. The authentication information can, for example, include an encryption key pair consisting of a public key and a private key. According to an example embodiment, the external electronic device can store the biometric data and the authentication information in the memory 130.

In operation 915, the external electronic device can transmit a biometric authentication information registration response signal that includes the authentication information and information related to the external electronic device, to the electronic device. According to an example embodiment, the external electronic device can include the public key among the encryption key pair, in the biometric authentication information registration response signal. The information related to the external electronic device can, for example, include identification information of the external electronic device, and/or type information of the medical sensor that the external electronic device possesses. But, according to various example embodiments of the present disclosure, the information related to the external electronic device is not limited to the aforementioned information.

Figure 10:
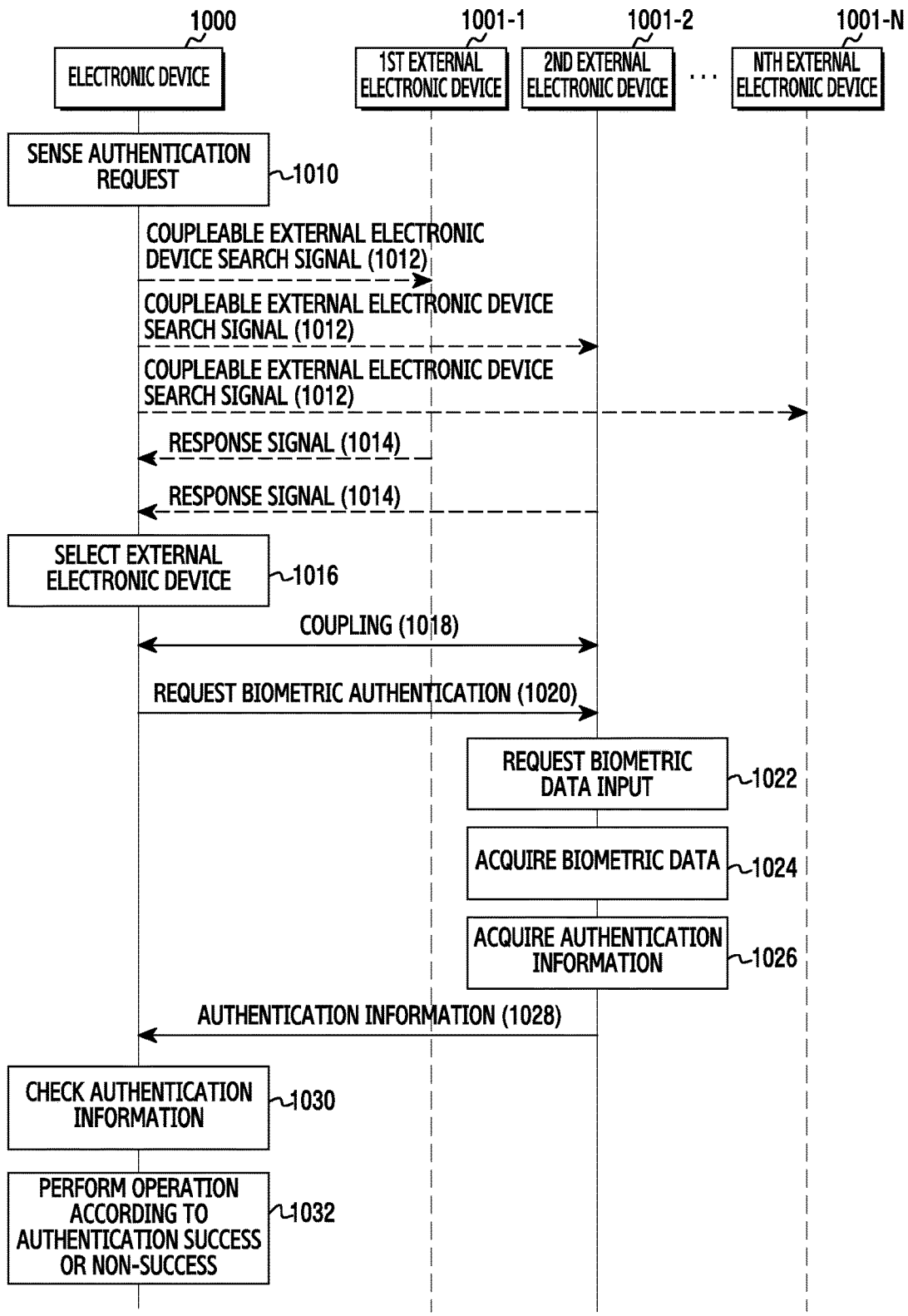
FIG. 10 is a ladder diagram illustrating an example of performing authentication in an electronic device and an external electronic device according to various example embodiments of the present disclosure.

FIG. 10 is a ladder diagram illustrating an example of performing authentication in an electronic device and an external electronic device according to various example embodiments of the present disclosure. In example embodiments below, respective operations can be performed in sequence as well, but are not necessarily performed in sequence. For example, the order of respective operations can be changed as well, and at least two operations can be performed in parallel as well. In accordance with an example embodiment, the electronic device 1000 can be the electronic device 101 of FIG. 1, and the external electronic devices 1001-1, 1001-2, and 1001-N can be the external electronic device 102 of FIG. 1. In accordance with an example embodiment, the electronic device 1000 can be the external electronic device 102 of FIG. 1, and the external electronic devices 1001-1, 1001-2, and 1001-N can be the electronic device 101 of FIG. 1. In FIG. 10, operations shown in dotted lines can be omitted in accordance with an example embodiment.

Referring to FIG. 10, in operation 1010, the electronic device 1000 can sense an authentication request. For example, the electronic device 1000 can sense that an authentication request event occurs by an input of a user or a request of an external electronic device. The authentication request event can be an event for connecting to an account through biometric data, an event for performing a specific function needing biometric-data based authentication in a state of connecting to an account, etc.

In operation 1012, the electronic device 1000 can broadcast a signal for searching an external electronic device whose coupling is available. For example, the electronic device 1000 can broadcast a search signal, so as to search the external electronic device whose communication coupling is available among external electronic devices existing around. In accordance with an example embodiment, the 1st external electronic device 1001-1 and the 2nd external electronic device 1001-2 can receive search signals from the electronic device 1000 respectively, but the Nth external electronic device 1001-N cannot receive a search signal from the electronic device 1000. For example, in a case where a distance between the electronic device 1000 and the Nth external electronic device 1001-N is equal to or is greater than a threshold distance in which short-range communication is available, the Nth external electronic device 1001-N cannot receive the search signal from the electronic device 1000. Or, in a case where a short-range communication function of the Nth external electronic device 1001-N is in an Off state, the Nth external electronic device 1001-N cannot receive the search signal from the electronic device 1000.

In operation 1014, each of the 1st external electronic device 1001-1 and the 2nd external electronic device 1001-2 receiving the search signals from the electronic device 1000 can transmit a response signal responsive to the search signal, to the electronic device 1000. For example, each of the 1st external electronic device 1001-1 and the 2nd external electronic device 1001-2 can transmit a response signal notifying that communication coupling (e.g., short-range communication coupling) is available, to the electronic device 1000.

In operation 1016, the electronic device 1000 can select the external electronic device for requesting authentication. According to an example embodiment, the electronic device 1000 can determine external electronic devices that have been previously registered to the memory 130 as authentication devices corresponding to an account of the electronic device, as a candidate external electronic device list, and select one external electronic device for requesting authentication among the external electronic device list.

For example, in a case where operation 1012 and operation 1014 are omitted, the electronic device 1000 can determine the external electronic devices registered to the memory 130, as the candidate external electronic device list, and select the external electronic device for requesting authentication in the candidate external electronic device list. For example, in a case where the 1st external electronic device 1001-1, the 2nd external electronic device 1001-2, and the Nth external electronic device 1001-N have been registered to the memory 130 as the authentication devices, the electronic device 1000 can select one external electronic device for requesting authentication based on information of the 1st, 2nd, and Nth external electronic devices 1001-1, 1001-2, and 1001-N.

According to an example embodiment, the electronic device 1000 can check external electronic devices whose communication coupling (e.g., short-range communication coupling) is available by using the received response signal, and compare the external electronic devices whose communication coupling is available and the external electronic devices that have been registered to the memory 130 as the authentication devices of respective accounts, and determine a candidate external electronic device list, and then select one external electronic device in the candidate external electronic device list.

In accordance with an example embodiment, the electronic device 1000 can select an external electronic device for authentication request, based on the number of the external electronic devices included in the candidate external electronic device list in the memory 130, external electronic device related information, additional information, or a combination thereof. The external electronic device related information can be information that is acquired from a signal received from the external electronic device. For example, the external electronic device related information can include identification information and/or sensor type information. The additional information can be information that is acquired based on a connection history of the external electronic device. For example, the additional information can include account information, information representing a master device or not, the latest connection time information, use frequency information, or a combination thereof. Here, for description convenience sake, a description is made on the assumption that the 2nd external electronic device 1001-2 is selected.

In operation 1018, the electronic device 1000 can perform communication coupling with the selected 2nd external electronic device 1001-2. For example, by transmitting/receiving a signal for communication coupling (e.g., short-range communication coupling) with the selected 2nd external electronic device 1001-2, the electronic device can perform the communication coupling with the 2nd external electronic device 1001-2. For example, by transmitting a signal requesting Bluetooth coupling and receiving a response signal accepting the Bluetooth coupling from the 2nd external electronic device 1001-2, the electronic device 1000 can perform a Bluetooth coupling procedure with the 2nd external electronic device 1001-2.

In operation 1020, the electronic device 1000 can perform biometric authentication for the communication-coupled 2nd external electronic device 1001-2. For example, the electronic device 100 can transmit a signal requesting to perform authentication using biometric data, to the 2nd external electronic device 1001-2, based on the short-range communication coupling. According to an example embodiment, the electronic device 1000 can encrypt random data, using authentication information (for example, public key) registered as biometric authentication information, and transmit a biometric authentication request signal including the encrypted random data to the 2nd external electronic device 1001-2.

In operation 1022, the 2nd external electronic device 1001-2 receiving the biometric authentication request signal from the electronic device 1000 can request a biometric data input. For example, after driving a medical sensor, the 2nd external electronic device 1001-2 can display a user interface requesting the biometric data input. For example, the 2nd external electronic device 1001-2 can drive a finger scan sensor, and display a screen requesting a fingerprint input. At this time, to help a user's fingerprint input within the screen requesting the fingerprint input, the 2nd external electronic device 1001-2 can display a fingerprint input region.

In operation 1024, the 2nd external electronic device 1001-2 can acquire biometric data. For example, the 2nd external electronic device 1001-2 can sense the user's biometric data through the driven medical sensor, and acquire sensing data converting the sensed biometric data into an electrical signal. For example, the 2nd external electronic device 1001-2 can sense the fingerprint of the user's finger that gets in contact (or touch) with the fingerprint input region within the screen of the 2nd external electronic device 1001-2, through the driven fingerprint sensor, and acquire sensing data converting the sensed fingerprint information into an electrical signal. According to an example embodiment, the 2nd external electronic device 1001-2 can compare the acquired biometric data and previously stored biometric data and perform authentication.

In operation 1026, the 2nd external electronic device 1001-2 can acquire authentication information. For example, in a case where the acquired biometric data and previously stored biometric data are the same as each other, the 2nd external electronic device 1001-2 can determine that authentication succeeds, and acquire a previously stored public key as the authentication information. Also, by acquiring the encrypted random data from the biometric authentication request signal and decoding the random data through a previously stored private key, the 2nd external electronic device 1001-2 can acquire the original random data.

In operation 1028, the 2nd external electronic device 1001-2 can transmit the acquired authentication information to the electronic device 1000. According to an example embodiment, the 2nd external electronic device 1001-2 can transmit a biometric authentication response signal that includes the authentication information, to the electronic device 1000, using short-range communication. According to an example embodiment, the 2nd external electronic device 1001-2 can generate a biometric authentication response signal that includes the authentication information and the random data together, and transmit the generated biometric authentication response signal to the electronic device 1000. For example, the random data included in the biometric authentication response signal can be data that is acquired by decoding the encrypted random data through the previously stored private key.

In operation 1030, the electronic device 1000 can compare the authentication information received from the 2nd external electronic device 1001-2 and biometric authentication information pre-registered to the electronic device 1000. According to an example embodiment, the electronic device 1000 can determine authentication success or non-success based on the authentication information and the random data that are included in the biometric authentication response signal. In accordance with an example embodiment, the electronic device 1000 can compare if the random data included in the biometric authentication response signal and the random data that the electronic device transmits as including in the biometric authentication request signal are the same as each other, and compare the authentication information included in the biometric authentication response signal and the previously registered biometric authentication information. According to an example embodiment, the electronic device can compare the random data included in the biometric authentication response signal and the random data that the electronic device transmits as including in the biometric authentication request signal, and check if the external electronic device having transmitted the biometric data response signal and the external electronic device that has been registered as an authentication device of an account at which a biometric authentication event has occurred are the same as each other based on the received authentication information.

In operation 1032, the electronic device 1000 can determine authentication success or non-success based on the comparison result, and perform an operation based on the authentication success or non-success.

According to an example embodiment, in a case where the random data included in the received biometric authentication response signal and the random data that the electronic device transmits as including in the biometric authentication request signal are the same as each other, and the authentication information included in the biometric authentication response signal and the previously registered biometric authentication information are the same as each other, the electronic device 1000 can determine that the authentication succeeds.

According to an example embodiment, in a case where it is determined that the random data included in the biometric authentication response signal and the random data that the electronic device transmits as including in the biometric authentication request signal are the same as each other, and the external electronic device having transmitted the biometric data response signal and the external electronic device registered as the authentication device of the account at which the biometric authentication event has occurred are the same as each other based on the received authentication information, the electronic device can determine that the authentication succeeds. At this time, the electronic device 1000 can perform an instruction corresponding to the authentication success. For example, the electronic device 1000 can display information notifying that the authentication has succeeded on a screen, and permit connection to a corresponding account. Or, the electronic device 1000 can perform a preset specific function that should be carried out at authentication success.

For another example, in a case where the random data included in the biometric authentication response signal and the random data that the electronic device transmits as including in the biometric authentication request signal are not the same as each other, and/or the authentication information included in the biometric authentication response signal and the previously registered biometric authentication information are not the same as each other, the electronic device 1000 can determine that the authentication fails. At this time, the electronic device 1000 can perform an instruction corresponding to the authentication failure. For example, the electronic device 1000 can display information notifying that the authentication has failed on the screen, and prohibit the connection to the corresponding account. Or, the electronic device 1000 can perform a preset specific function that should be carried out at authentication failure. Or, the electronic device 1000 can return to operation 1016 and select another external electronic device for requesting authentication, and request biometric authentication to the another external electronic device.

Figure 11A:
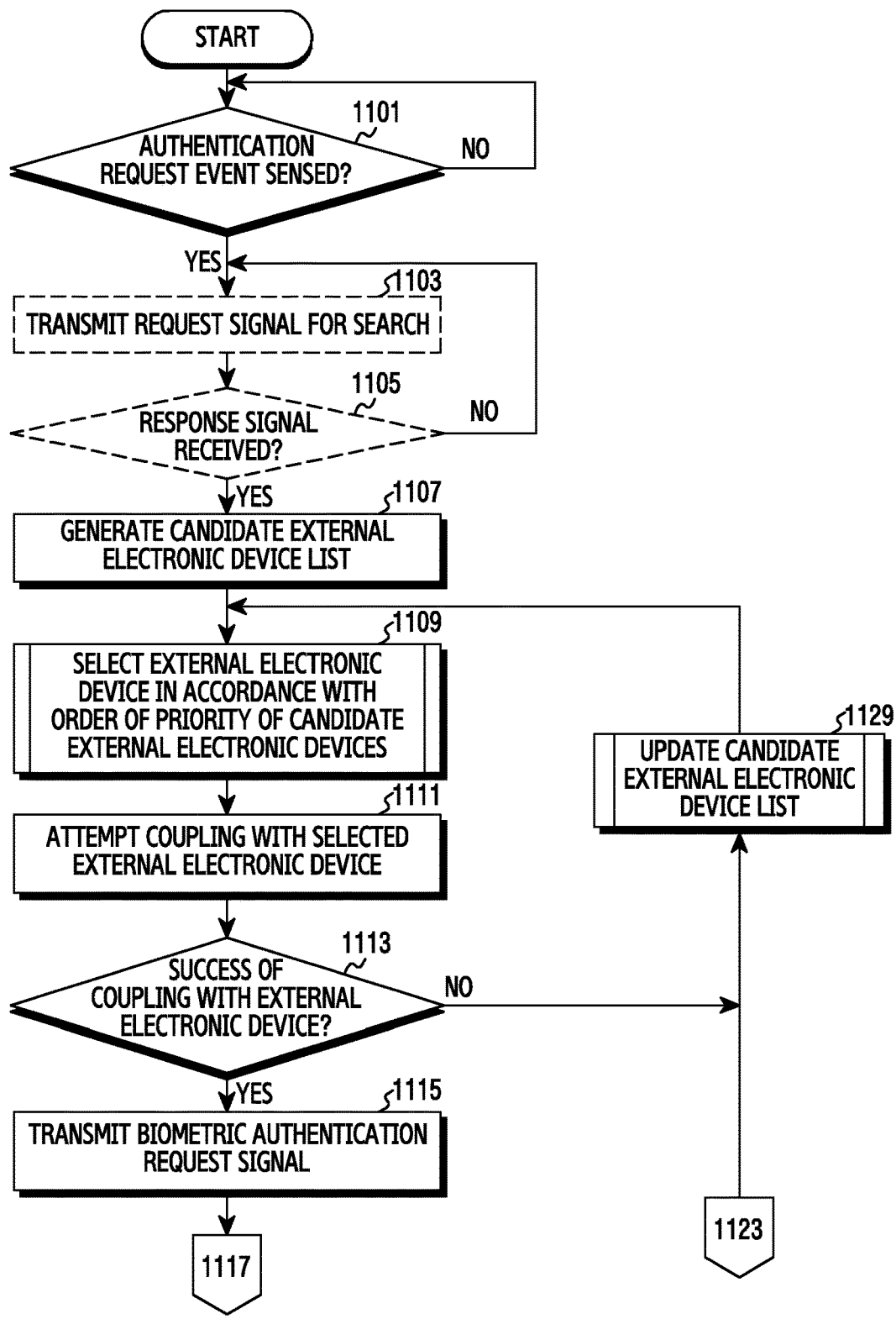
FIG. 11A and FIG. 11B are flowchart illustrating an example of performing authentication in an electronic device according to various example embodiments of the present disclosure.
Figure 11B:
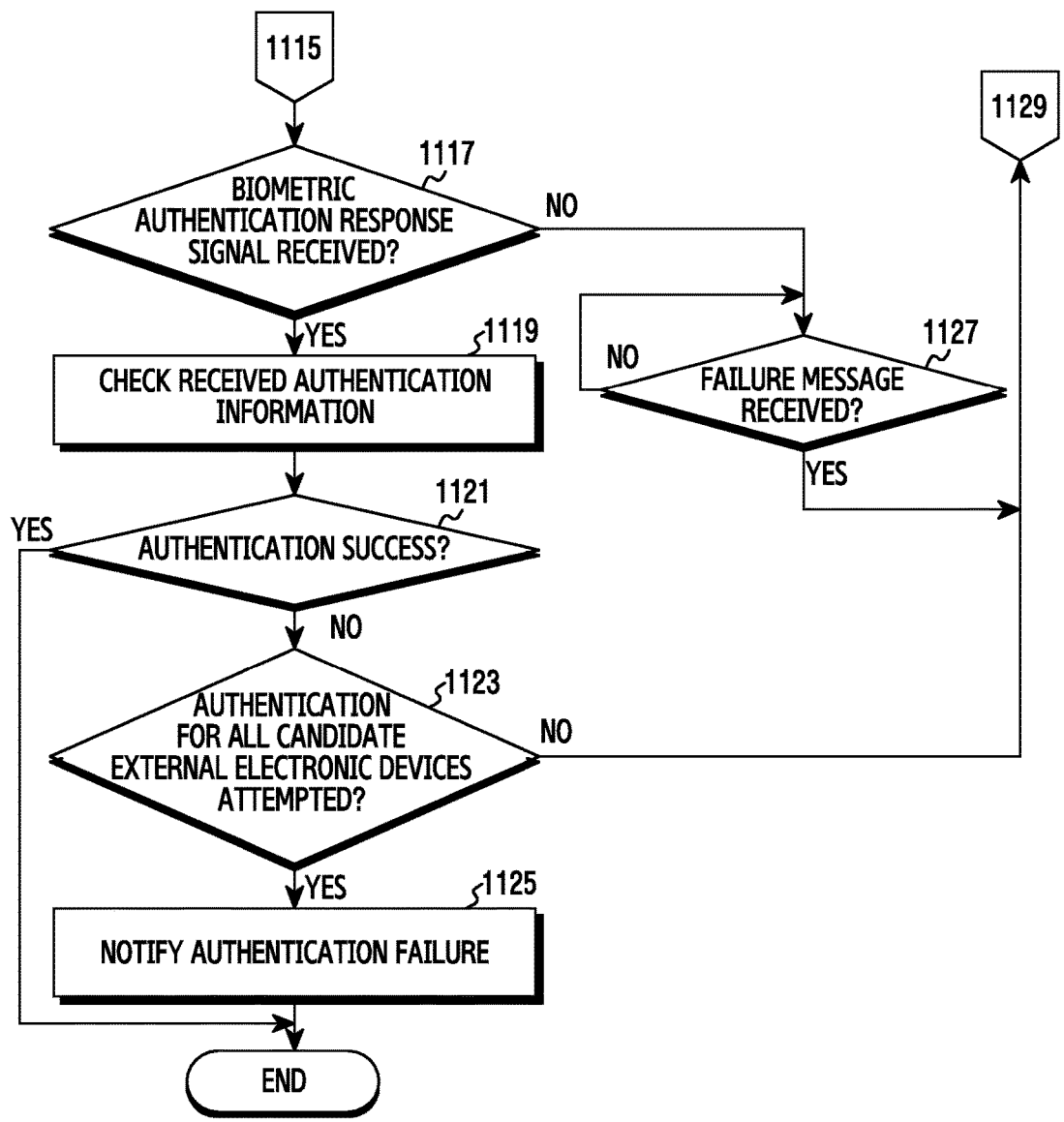

FIG. 11A and FIG. 11B are flowchart illustrating an example of performing authentication in an electronic device according to various example embodiments of the present disclosure. In example embodiments below, respective operations can be performed in sequence as well, but are not necessarily performed in sequence. For example, the order of respective operations can be changed as well, and at least two operations can be performed in parallel as well. Here, the electronic device can be the electronic device 101 of FIG. 1 and/or the electronic device 1000 of FIG. 10. And, the external electronic device can be the external electronic device 201 of FIG. 2 and/or the external electronic device 1001-1, 1001-2, or 1001-N of FIG. 10. In FIG. 11, block operations shown in dotted lines can be omitted in accordance with an example embodiment.

Referring to FIG. 11A and FIG. 11B, in operation 1101, the electronic device can determine if an authentication request event is sensed. For example, the electronic device can determine that the authentication request event using biometric data occurs by an input of a user or a request of an external electronic device. For example, in a case where the electronic device senses a user input for connecting to an account through the biometric data, or a user input for performing a specific function needing biometric-data based authentication in a state of connecting to the account, the electronic device can sense that the authentication request event occurs.

In operation 1103, the electronic device can transmit a request signal for searching an external electronic device whose coupling is available. For example, the electronic device can broadcast a search request signal, so as to search an external electronic device in which communication (e.g., short-range communication) is available among external electronic devices existing around.

In operation 1105, the electronic device can sense if a response signal is received. For example, the electronic device can sense if the response signal is received from an external electronic device in response to the search request signal. If the response signal is not received from the external electronic device, the electronic device can return to operation 1103 and retransmit a search request signal.

In a case where the response signal is received from the external electronic device, in operation 1107, the electronic device can generate a candidate external electronic device list. According to an example embodiment, the electronic device can determine external electronic devices that have been registered to the memory 130 as authentication devices of accounts, as candidate external electronic devices capable of requesting authentication. For example, in a case where operation 1103 and operation 1105 are omitted, the electronic device can determine the external electronic devices that have been registered to the memory 130 as the authentication devices, as the candidate external electronic devices. According to an example embodiment, the electronic device can check external electronic devices whose short-range communication coupling is available, using the received response signals, and compare the external electronic devices whose short-range communication coupling is available and the external electronic devices that have been registered to the memory 130 as the authentication devices of the respective accounts, and generate a candidate external electronic device list. For example, the electronic device can determine the external electronic devices in which short-range communication coupling is available and which have been previously registered to the memory 130, as the candidate external electronic devices, and generate a list including the checked external electronic devices.

In operation 1109, the electronic device can select an external electronic device for authentication request in accordance with the order of priority of the candidate external electronic devices. According to an example embodiment, the electronic device can determine the order of priority of the candidate external electronic devices based on information (e.g., identification information, biometric sensor type information, the latest connection time, use frequency, account information, information representing a master device or not, etc.) of the candidate external electronic devices that have been pre-registered to the memory 130, and select one external electronic device for requesting authentication based on the priority order.

In operation 1111, the electronic device can attempt coupling with the selected external electronic device. For example, the electronic device can transmit a signal requesting communication coupling (e.g., short-range communication coupling) to the selected external electronic device, based on the identification information of the selected external electronic device. For example, the electronic device can transmit a Bluetooth coupling request signal that includes the identification information of the selected external electronic device.

In operation 1113, the electronic device can determine if the coupling with the selected external electronic device has succeeded. For example, in a case where a response signal accepting the communication coupling is received from the selected external electronic device in response to operation 1111, the electronic device can perform a communication coupling procedure with the selected external electronic device, and determine that the coupling with the selected external electronic device succeeds. In another example, in a case where the response signal accepting the communication coupling is not received from the selected external electronic device in response to operation 1111, the electronic device can determine that the coupling with the selected external electronic device fails.

In a case where the coupling with the selected external electronic device fails, in operation 1129, the electronic device can update the candidate external electronic device list. For example, the electronic device can determine the remaining external electronic devices except for a corresponding external electronic device whose communication coupling has failed among the external electronic devices included in the candidate external electronic device list, as candidate external electronic devices capable of requesting authentication.

In a case where the coupling with the selected external electronic device succeeds, in operation 1115, the electronic device can transmit a biometric data request signal. For example, the electronic device can transmit a signal requesting biometric data to the communication-coupled external electronic device through a coupled communication scheme (e.g., short-range communication scheme). According to an example embodiment, the electronic device can encrypt random data through authentication information (for example, public key) that have been registered as biometric authentication information, and transmit the biometric authentication request signal including the encrypted random data to the external electronic device.

In operation 1117, the electronic device can check if a biometric data response signal is received from the external electronic device. For example, the electronic device can check if the biometric data response signal that includes authentication information (e.g., public key) and random data is received from the external electronic device within a preset threshold time. In a case where the biometric data response signal is not received within the preset threshold time, in operation 1127, the electronic device can check if a failure message is received from the external electronic device. The failure message can be received in a case where biometric data is not sensed through a medical sensor within the preset threshold time in the external electronic device.

In a case where the failure message is received, in operation 1129, the electronic device can update the candidate external electronic device list. For example, the electronic device can determine the remaining external electronic devices except for the external electronic device whose communication coupling has failed and/or the external electronic device corresponding to the failure message, among the external electronic devices included in the candidate external electronic device list, as candidate external electronic devices capable of requesting authentication.

In a case where the biometric data response signal is received within the preset threshold time, in operation 1119, the electronic device can check the received authentication information. According to an example embodiment, the electronic device can determine authentication success or non-success, based on the authentication information included in the biometric authentication response signal. In accordance with an example embodiment, the electronic device can compare if random data included in the biometric authentication response signal and random data that the electronic device transmits as including in the biometric authentication request signal are the same as each other. In a case where the two random data are the same as each other, the electronic device can compare the authentication information included in the biometric authentication response signal and the previously registered biometric authentication information. According to an example embodiment, the electronic device can compare the random data included in the biometric authentication response signal and the random data that the electronic device transmits as including in the biometric authentication request signal. In a case where the two random data are the same as each other, the electronic device can check if the external electronic device having transmitted the biometric data response signal and the external electronic device having been registered as an authentication device of an account at which a biometric authentication event has occurred are the same as each other based on the received authentication information.

In operation 1121, the electronic device can determine if the authentication has succeeded based on the received authentication information. For example, in a case where the random data included in the received biometric authentication response signal and the random data that the electronic device transmits as including in the biometric authentication request signal are the same as each other, and the authentication information included in the biometric authentication response signal and the previously registered biometric authentication information are the same as each other, the electronic device can determine that the authentication succeeds. For another example, in a case where the random data included in the biometric authentication response signal and the random data that the electronic device transmits as including in the biometric authentication request signal are not the same as each other, and/or the authentication information included in the biometric authentication response signal and the previously registered biometric authentication information are not the same as each other, the electronic device 1000 can determine that the authentication fails.

In a case where the authentication succeeds, the electronic device ends the operation procedure according to an example embodiment of the present disclosure. At this time, the electronic device can perform an instruction corresponding to the authentication success. For example, the electronic device can display information notifying that the authentication has succeeded on a screen, and permit connection to a corresponding account. Or, the electronic device can perform a preset specific function that should be carried out at authentication success.

In a case where the authentication fails, in operation 1123, the electronic device can determine if authentication on all the candidate external electronic devices has been attempted. For example, the electronic device can determine if the authentication on all the candidate external electronic devices has been attempted but the authentication has failed. Here, a case where the electronic device has attempted the authentication on the external electronic device but the authentication has failed can include a case where the electronic device has requested communication coupling to the external electronic device but the communication coupling has failed, a case where the electronic device has requested biometric data to the external electronic device but a failure message is received, and/or a case where the electronic device has received authentication information from the external electronic device but the received authentication information does not match with previously stored biometric authentication information.

In a case where the authentication on all the candidate external electronic devices has not been attempted, in operation 1129, the electronic device can update the candidate external electronic device list. For example, the electronic device can determine the remaining external electronic devices except for the external electronic device whose communication coupling has failed, the external electronic device corresponding to the failure message, and/or the external electronic device corresponding to authentication-failed biometric data among the external electronic devices included in the candidate external electronic device list, as candidate external electronic devices capable of requesting authentication.

In a case where the authentication on all the candidate external electronic devices has been attempted, in operation 1125, the electronic device can notify an authentication failure. For example, in a case where the authentication on all the candidate external electronic devices has been attempted, the electronic device can determine that an external electronic device on which authentication using biometric data is available does not exist around, and display information notifying a user that the authentication has failed, or provide sound through a speaker. At this time, the electronic device can perform an instruction corresponding to the authentication failure. For example, the electronic device can display information notifying that the authentication has failed on a screen while prohibiting connection to a corresponding account. Or, the electronic device can perform a preset specific function that should be carried out at authentication failure.

Figure 12A:
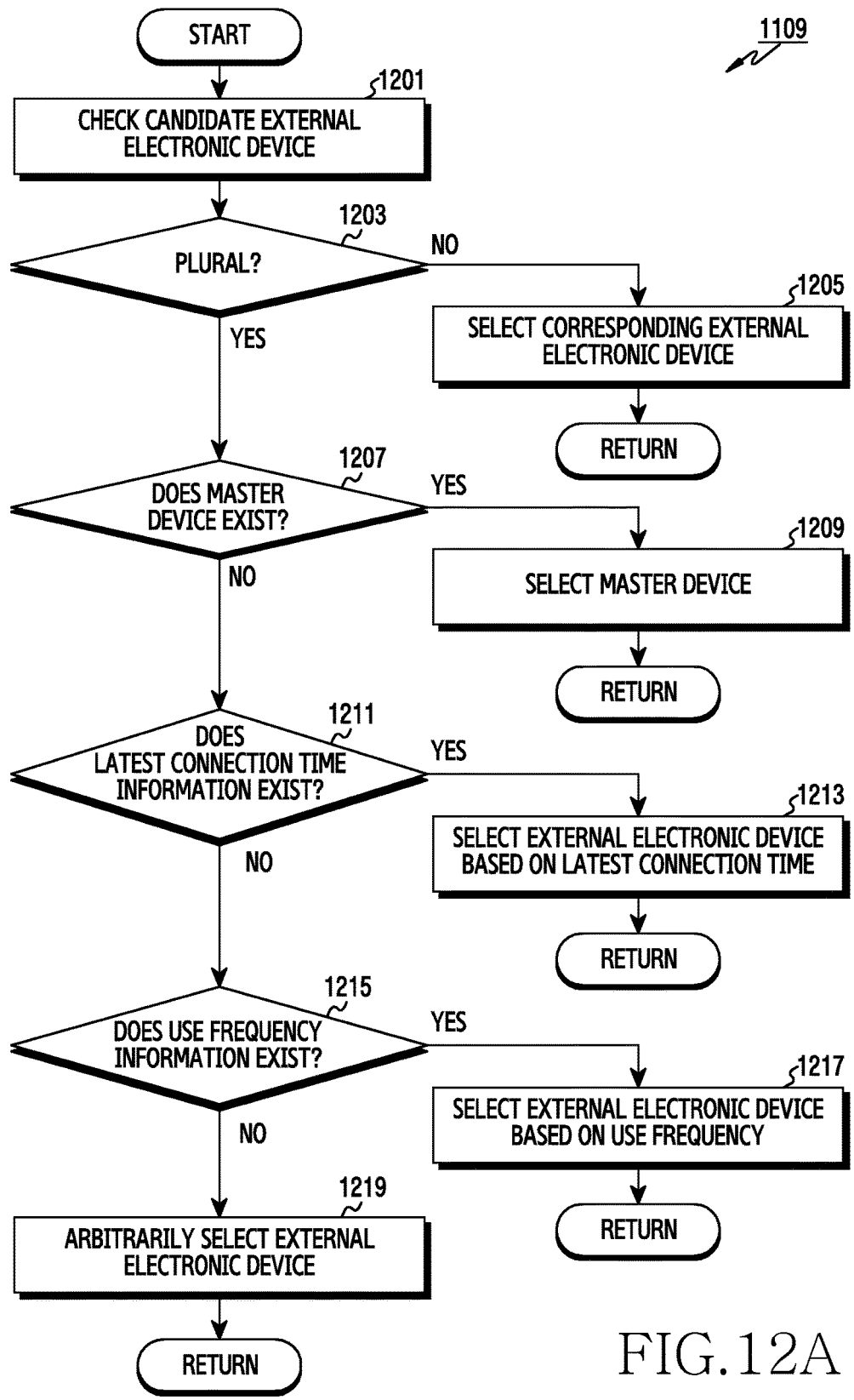
FIG. 12A is a flowchart illustrating an example of selecting an external electronic device in an electronic device according to various example embodiments of the present disclosure.

FIG. 12A is a flowchart illustrating an example of selecting an external electronic device in an electronic device according to various example embodiments of the present disclosure. The following description is made for operation 1109 of FIG. 11 in which the electronic device selects the external electronic device. In an example embodiment below, respective operations can be performed in sequence as well, but are not necessarily performed in sequence. For example, the order of respective operations can be changed as well, and at least two operations can be performed in parallel as well.

Referring to FIG. 12A, in operation 1201, the electronic device can check candidate external electronic devices. In accordance with an example embodiment, the electronic device can determine all or some of external electronic devices that have been registered to the memory 130 as authentication devices, as the candidate external electronic devices.

In accordance with an example embodiment, the electronic device can check external electronic devices corresponding to an account at which an authentication request event occurs, among the external electronic devices registered to the memory 130 as the authentication devices, and can determine some or all of the corresponding external electronic devices as the candidate external electronic devices. For example, the electronic device can determine the remaining external electronic devices except for authentication-failed external electronic devices among all the external electronic devices registered to a corresponding account, as the candidate external electronic devices.

In accordance with an example embodiment, the electronic device can determine the candidate external electronic devices, using medical sensor type information corresponding to the authentication request event as well. For example, the electronic device can check if the authentication request event is an event using which type of biometric data, and determine external electronic devices having medical sensor type information corresponding to the corresponding type, as the candidate external electronic devices. In a concrete example, when the authentication request event using fingerprint information is sensed, the electronic device can determine external electronic devices having finger scan sensors among the external electronic devices registered to the memory 130 as authentication devices of respective accounts, as the candidate external electronic devices. Or, the electronic device can determine the candidate external electronic devices, using all of account information and medical sensor type information as well. In accordance with an example embodiment, the checked candidate external electronic devices can be those updated in operation 1129 of FIG. 11.

In operation 1203, the electronic device can check if the checked candidate external electronic device is plural in number. In accordance with an example embodiment, the candidate external electronic device can be one as well, and can be plural in number as well.

In a case where the candidate external electronic device is one, in operation 1205, the electronic device can select the corresponding one candidate external electronic device. For example, because the candidate external electronic device is one, the electronic device can just select the corresponding external electronic device, without considering other information of the external electronic device.

In a case where the candidate external electronic device is plural in number, in operation 1207, the electronic device can check if a master device exists among the candidate external electronic devices. For example, the electronic device can check if an external electronic device that is set as the master device exists among the candidate external electronic devices.

In a case where the master device exists, in operation 1209, the electronic device can select the external electronic device that is set as the master device. In accordance with an example embodiment, in a case where the candidate external electronic device that is set as the master device is one, the electronic device can determine the candidate external electronic device that is set as the master device, as an external electronic device for authentication request.

In accordance with an example embodiment, in a case where the candidate external electronic device that is set as the master device is plural in number, the electronic device can determine the order of priority of the corresponding candidate external electronic devices, using other information (e.g., medical sensor type information, account information, the latest connection time information, a use frequency, etc.) of the candidate external electronic devices that are set as the master devices, and select a candidate external electronic device of high priority order.

In a case where the master device does not exist, in operation 1211, the electronic device can check if the latest connection time information exists in information of the candidate external electronic devices. For example, the electronic device can check if a candidate external electronic device having the latest connection time information exists, by searching information of each of the candidate external electronic devices in the memory 130.

In a case where the latest connection time information exists in the information of the candidate external electronic devices, in operation 1213, the electronic device can select an external electronic device based on the latest connection time information. In accordance with an example embodiment, in a case where the candidate external electronic device having the latest connection time information is one in number, the electronic device can determine that the corresponding candidate external electronic device latest connects to the electronic device through biometric-data based authentication, and select the corresponding candidate external electronic device. In accordance with an example embodiment, in a case where the candidate external electronic device having the latest connection time information is plural in number, the electronic device can determine the order of priority of a plurality of candidate external electronic devices based on the latest connection time information, and select an external electronic device of high priority order.

In a case where the latest connection time information does not exist in the information of the candidate external electronic devices, in operation 1215, the electronic device can determine if use frequency information exists. For example, the electronic device can check if a candidate external electronic device having the use frequency information exists, by searching information of each of the candidate external electronic devices in the memory 130.

In a case where the use frequency information exists in the information of the candidate external electronic devices, in operation 1217, the electronic device can select an external electronic device based on the use frequency information. In accordance with an example embodiment, in case where the candidate external electronic device having the use frequency information is one in number, the electronic device can determine that the corresponding candidate external electronic device most frequently connects to the electronic device through biometric-data based authentication, and select the corresponding candidate external electronic device. In accordance with an example embodiment, in a case where the candidate external electronic device having the use frequency information is plural in number, the electronic device can determine the order of priority of a plurality of candidate external electronic devices based on the use frequency information, and select a candidate external electronic device of high priority order.

In a case where the use frequency information does not exist in the information of the candidate external electronic devices, in operation 1219, the electronic device can arbitrarily select one external electronic device among the candidate external electronic devices.

In the aforementioned description, to select an external electronic device, an electronic device first checks whether a master device exists among candidate external electronic devices and then, checks whether the latest connection time information and use frequency information exist. However, this is an example, and various example embodiments of the present disclosure are not limited to this. For example, the electronic device can first of all check if the latest connection time information exists and then, check whether the master device exists and whether the use frequency information exists, thereby selecting the external electronic device as well.

Figure 12B:
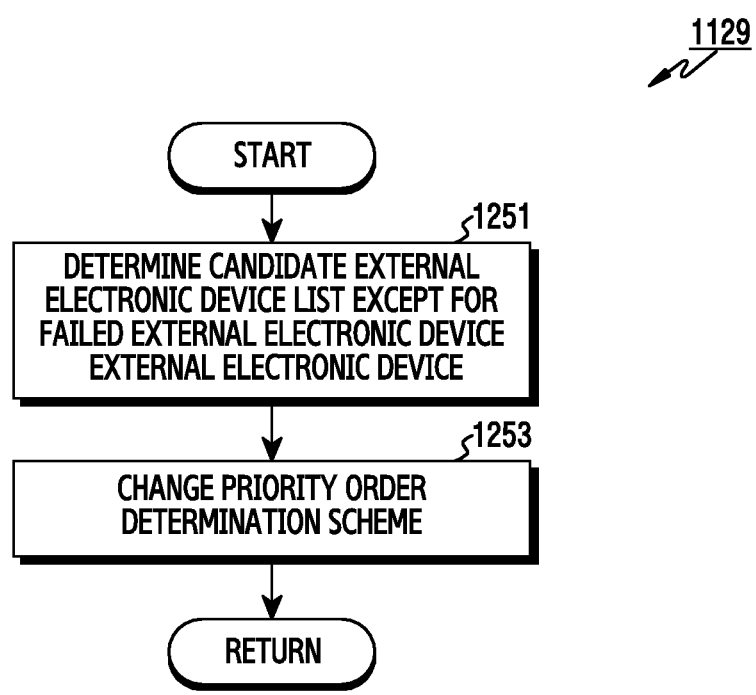
FIG. 12B is a flowchart illustrating an example of updating a candidate external electronic device list in an electronic device according to various example embodiments of the present disclosure.

FIG. 12B is a flowchart for updating a candidate external electronic device list in an electronic device according to various example embodiments of the present disclosure. The following description is made for operation 1129 of FIG. 11 in which the electronic device updates the candidate external electronic device list. In an example embodiment below, respective operations can be performed in sequence as well, but are not necessarily performed in sequence. For example, the order of respective operations can be changed as well, and at least two operations can be performed in parallel as well.

Referring to FIG. 12B, in operation 1251, the electronic device can determine a candidate external electronic device list except for (e.g., excluding) a failed external electronic device. For example, the failed external electronic device can include an external electronic device whose communication coupling has failed, an external electronic device corresponding to a failure message, and/or an external electronic device corresponding to authentication information on which authentication has failed. For example, the electronic device can determine the remaining external electronic devices except for the external electronic device whose communication coupling has failed, the external electronic device corresponding to the failure message, and/or the external electronic device corresponding to the authentication information on which authentication has failed among previously determined candidate external electronic devices, as candidate external electronic devices.

In operation 1253, the electronic device can change a priority order determination scheme. The priority order determination scheme can include a scheme of with the highest priority, determining an external electronic device being a master device, a scheme of with the highest priority, determining an external electronic device in which the latest connection time is closest to a current time point, a scheme of with the highest priority, determining an external electronic device of the highest use frequency, etc.

For example, in a case where the electronic device uses the scheme of with the highest priority, determining the external electronic device being the master device at previous external electronic device selection, the electronic device can change the priority order determination scheme, to use the scheme of with the highest priority, determining the external electronic device in which the latest connection time is closest to the current time point, at next external electronic device selection.

For another example, in a case where the electronic device uses the scheme of with the highest priority, determining the external electronic device in which the latest connection time is closest to the current time point at previous external electronic device selection, the electronic device can change the priority order determination scheme, to use the scheme of with the highest priority, determining the external electronic device of the highest use frequency, at next external electronic device selection.

Figure 13:
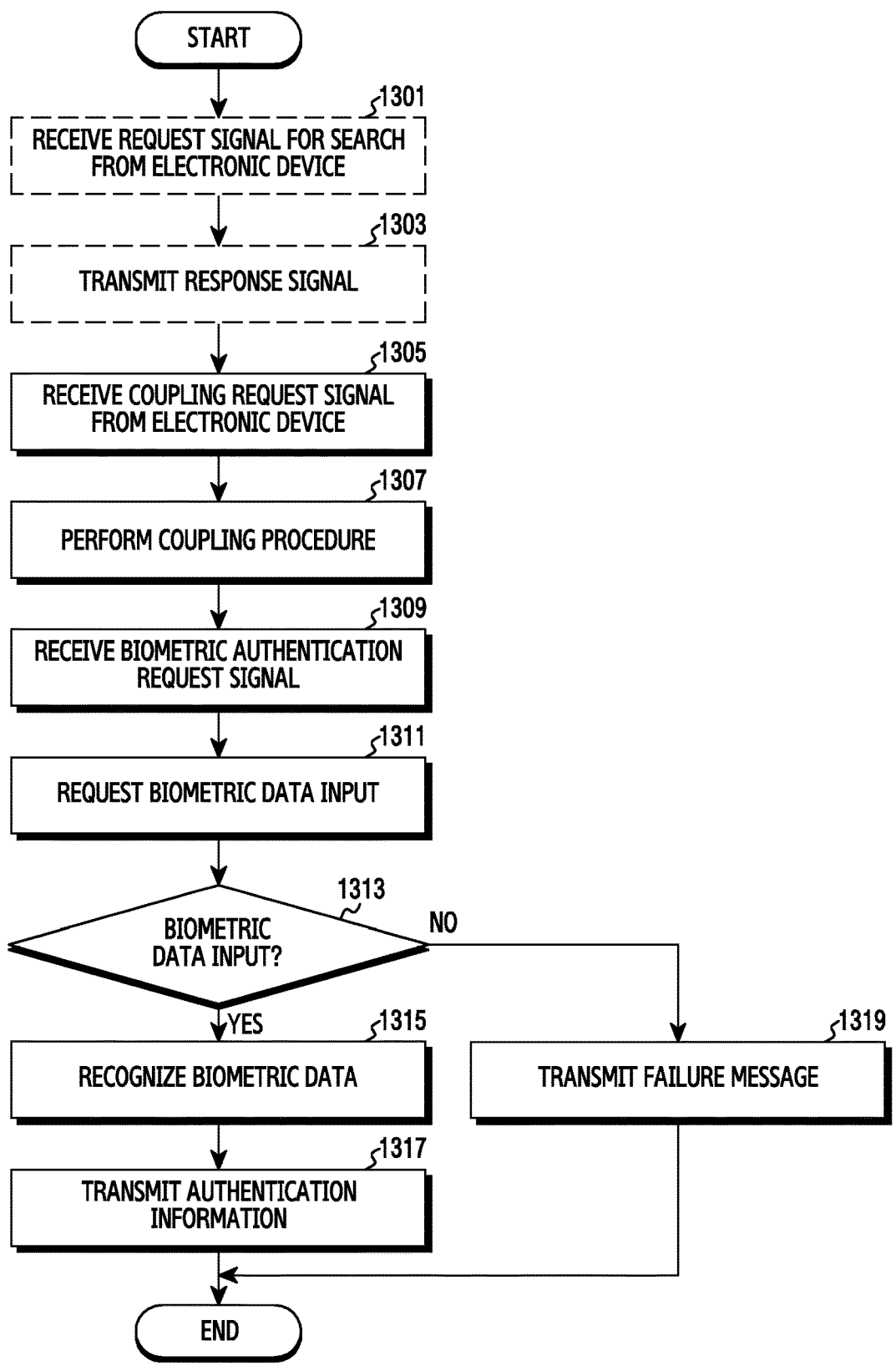
FIG. 13 is a flowchart illustrating an example of performing authentication in an external electronic device according to various example embodiments of the present disclosure.

FIG. 13 is a flowchart illustrating an example of performing authentication in an external electronic device according to various example embodiments of the present disclosure. In an example embodiment below, respective operations can be performed in sequence as well, but are not necessarily performed in sequence. For example, the order of respective operations can be changed as well, and at least two operations can be performed in parallel as well. Here, the electronic device can be the electronic device 101 of FIG. 1 and/or the electronic device 1000 of FIG. 10. And, the external electronic device can be the external electronic device 102 of FIG. 1 and/or the external electronic device 1001-1, 1001-2, or 1001-N of FIG. 10.

Referring to FIG. 13, in operation 1301, the external electronic device can receive a request signal for search from the electronic device. For example, the external electronic device can receive a search request signal for searching an external electronic device whose communication coupling (e.g., short-range communication coupling) is available from the electronic device.

In operation 1303, the external electronic device can transmit a response signal responsive to the request signal. For example, in response to the request signal, the external electronic device can transmit a response signal notifying that it is a state in which communication coupling is available, to the electronic device.

In operation 1305, the external electronic device can receive a coupling request signal from the electronic device. For example, the external electronic device can receive a signal requesting communication coupling (e.g., short-range communication coupling) from the electronic device. For example, the external electronic device can receive a signal requesting Bluetooth coupling from the electronic device.

In operation 1307, the external electronic device can perform a coupling procedure with the electronic device. For example, the external electronic device can transmit a signal accepting the short-range communication coupling to the electronic device, using a coupled communication scheme (e.g., short-range communication scheme), and perform a communication coupling procedure with the electronic device. For example, the external electronic device can transmit a response signal accepting the Bluetooth coupling to the electronic device, and perform a Bluetooth coupling procedure with the external electronic device.

In operation 1309, the external electronic device can receive a biometric data request signal from the communication-coupled electronic device. For example, the external electronic device can receive the biometric data request signal from the electronic device based on the short-range communication coupling. According to an example embodiment, the biometric data request signal can include encrypted random data. For example, the encrypted random data can mean random data that is encrypted using a public key stored in the electronic device.

In operation 1311, the external electronic device can request a biometric data input. For example, the external electronic device can display a user interface for requesting the biometric data input to a user. The external electronic device can drive a medical sensor so as to recognize biometric data. For example, the external electronic device can drive a finger scan sensor, and display a screen requesting a fingerprint input. To help a user's fingerprint input within the screen requesting the fingerprint input, the external electronic device can display a fingerprint input region.

In operation 1313, the external electronic device can sense if biometric data is input. For example, the external electronic device can sense if the biometric data is recognized by the medical sensor within a preset threshold time. For example, if it is sensed that the user's finger gets in contact (or touch) with the fingerprint input region within the screen, the external electronic device can determine that the biometric data is input, and sense the user's fingerprint through the finger scan sensor, and convert sensed fingerprint information into an electrical signal, thereby acquiring the biometric data. On the other hand, if it is not sensed that the user's finger gets in contact (or touch) with the fingerprint input region within the screen within a threshold time, the external electronic device can determine that the biometric data is not input.

In a case where the biometric data is not input, in operation 1319, the external electronic device can transmit a failure message representing that biometric data acquisition has failed, to the electronic device.

In a case where the biometric data is input, in operation 1315, the external electronic device can recognize the biometric data and determine authentication success or non-success. For example, by comparing the biometric data acquired through the medical sensor and previously stored biometric data, the external electronic device can determine the authentication success or non-success.

In a case where the biometric data acquired through the medical sensor and the previously stored biometric data are the same as each other, the external electronic device can determine that the authentication succeeds. In a case where the biometric data acquired through the medical sensor and the previously stored biometric data are different from each other, the external electronic device can determine that the authentication fails.

In a case where the authentication succeeds, the external electronic device can acquire a previously stored public key as authentication information. Also, by decoding the encrypted random data included in the biometric authentication request signal through a private key, the external electronic device can acquire the original random data.

In operation 1317, the external electronic device can transmit the authentication information to the electronic device. In accordance with an example embodiment, the external electronic device can transmit the authentication information (e.g., public key) and the random data to the electronic device, together. For example, the external electronic device can transmit a biometric data response signal that includes the authentication information and the random data to the electronic device, using short-range communication.

According to various example embodiments of the present disclosure mentioned above, a method for operating in an electronic device can include the operations of storing biometric authentication information about one or more external electronic devices and one or more identification information corresponding to the one or more external electronic devices, the one or more external electronic devices including sensors for acquiring biometric data corresponding to the biometric authentication information, receiving a request related with authentication, selecting at least one external electronic device among the one or more external electronic devices in relation with the authentication, transmitting a request for authentication to the at least one external electronic device, using at least one identification information corresponding to the at least one external electronic device among the one or more identification information, and performing the authentication, based at least on authentication information received from the at least one external electronic device and the biometric authentication information.

According to various example embodiments of the present disclosure, the selecting operation can include the operations of determining one or more external electronic devices corresponding to accounts for performing the authentication among the one or more external electronic devices, and selecting the at least one external electronic device among the determined one or more external electronic devices.

According to various example embodiments of the present disclosure, the selecting operation can include the operations of determining one or more external electronic devices whose short-range communication coupling is available among the one or more external electronic devices, and selecting the at least one external electronic device among the determined one or more external electronic devices.

According to various example embodiments of the present disclosure, the method can further include the operations of, before transmitting a request related with the acquisition of the biometric data, attempting short-range communication coupling with the selected at least one external electronic device and, in a case where the short-range communication coupling fails, selecting a previously non-selected external electronic device among the one or more external electronic devices as the at least one external electronic device, based on information that is registered to an account so as to perform the authentication.

According to various example embodiments of the present disclosure, the operation of transmitting the request related with the biometric data can include the operations of, in a case where the authentication information is not received from the selected at least one external electronic device, selecting a previously non-selected another at least one external electronic device among the one or more external electronic devices, based on information that is registered to an account so as to perform the authentication, and transmitting a request for the authentication to the another at least one external electronic device, using at least one identification information corresponding to the another at least one external electronic device.

According to various example embodiments of the present disclosure, the operation of performing the authentication includes the operations of, in a case where it is determined that the authentication fails based at least on the comparison, selecting a previously non-selected another at least one external electronic device among the one or more external electronic devices, based on information that is registered to an account so as to perform the authentication, and performing the authentication based on authentication information received from the another at least one external electronic device, using at least one identification information corresponding to the another at least one external electronic device.

According to various example embodiments of the present disclosure, the selecting operation can include the operation of, in a case where information registered to an account so as to perform the authentication satisfies a designated condition, selecting the at least one external electronic device in relation with the authentication, using the registered information.

According to various example embodiments of the present disclosure, the selecting operation can include the operation of, in a case where the registered information satisfies another designated condition, selecting the at least one external electronic device in relation with the authentication in accordance with designated order.

According to various example embodiments of the present disclosure, the registered information can include the latest time information at which an external electronic device connects to the electronic device, a frequency at which the external electronic device connects to the electronic device, information representing whether the external electronic device is a master device, sensor type information of the external electronic device, or a combination thereof.

According to various example embodiments of the present disclosure, the selecting operation can include the operations of determining the order of priority of the one or more external electronic devices through the registered information, and selecting the at least one external electronic device based on the priority order.

The term "module" used in the present disclosure can, for example, refer to a unit including one of hardware, software, or firmware or a combination of two or more of them. The "module" can, for example, be used interchangeably with the terms "unit", "logic", "logical block", "component", "circuit", etc. The "module" can be the minimum unit of an integrally constructed component or a part thereof. The "module" can be the minimum unit performing one or more functions or a part thereof as well. The "module" can be implemented mechanically or electronically. For example, the "module" can include at least one of a dedicated processor, a CPU, an Application-Specific Integrated Circuit (ASIC) chip performing some operations, a Field-Programmable Gate Arrays (FPGAs), or a programmable-logic device, which is well known to the art or will be developed in the future.

At least a part of a device (e.g., modules or functions thereof) or method (e.g., operations) according to various example embodiments can, for example, be implemented as an instruction that is stored in a computer-readable storage media in the form of a program module. In a case where the instruction is executed by a processor (e.g., processor 120), the processor can perform a function corresponding to the instruction. The computer-readable storage media can be the memory 130, for example.

The computer-readable recording media can include a hard disk, a floppy disk, a magnetic media (e.g., magnetic tape), an optical media (e.g., Compact Disc-ROM (CD-ROM), Digital Versatile Disk (DVD), magneto-optical media (e.g., floptical disk)), a hardware device (e.g., ROM, RAM, flash memory, etc.), etc. Also, a program command can include not merely a mechanical language code such as a code made by a compiler, but also a high-level language code that is executable by a computer by using an interpreter, etc. The aforementioned hardware device can be configured to work as one or more software modules so as to perform operations of various example embodiments, and vice versa.

The module or program module according to various example embodiments can include at least one or more of the aforementioned elements, or omit some of them, or further include additional another element. Operations carried out by the module, program module or another constituent element according to various example embodiments can be executed in a sequential, parallel, repeated or heuristic method. Also, some operations can be executed in another order or can be omitted, or another operation can be added. And, the example embodiments disclosed in the present disclosure are suggested for explaining and understanding of the technology content disclosed, and does not limit the scope of the technology mentioned in the present disclosure. Accordingly, the scope of the present disclosure should be understood as including all modifications or various other example embodiments based on the technological spirit of the present disclosure.

And, example embodiments disclosed in the present disclosure are suggested for explaining and understanding of the technology content disclosed, and does not limit the scope of various example embodiments of the present disclosure. Accordingly, the scope of various example embodiments of the present disclosure should be understood as including all modifications or various other example embodiments based on the technological spirit of the various example embodiments of the present disclosure.

As described above, an electronic device and an operating method thereof according to various example embodiments are capable of reducing the time required for authentication, by determining the order of priority of external electronic devices with medical sensors based on information about pre-registered external electronic devices, and attempting authentication in order of the external electronic devices of higher priority order in the electronic device.

What is claimed is:

1. An electronic device comprising:
  a memory configured to store biometric authentication information of a plurality of external electronic devices and a plurality of identification information respectively corresponding to the plurality of external electronic devices, the plurality of external electronic devices comprising sensors configured to acquire biometric data corresponding to the biometric authentication information; and
  a processor,
  wherein the processor is configured to:
    detect an input for an authentication,
    select at least one external electronic device from among the plurality of external electronic devices for the authentication,
    transmit a request for the authentication to the at least one external electronic device, using at least one identification information corresponding to the at least one external electronic device from among the plurality of identification information, and perform the authentication, based at least on authentication information received from the at least one external electronic device and the biometric authentication information, wherein the authentication information is obtained, by the at least one external electronic device, from a user after the at least one external electronic device receives the request for the authentication.

2. The electronic device of claim 1, wherein the processor is configured to determine one or more external electronic devices corresponding to accounts for performing the authentication among the plurality of external electronic devices, and select the at least one external electronic device from among the determined one or more external electronic devices.

3. The electronic device of claim 1, wherein the processor is configured to:
 determine one or more external electronic devices having short-range communication coupling available from among the plurality of external electronic devices, and
 select the at least one external electronic device from among the determined one or more external electronic devices.

4. The electronic device of claim 1, wherein the processor is configured to:
 attempt short-range communication coupling with the selected at least one external electronic device, and
 select a previously non-selected external electronic device from among the plurality of external electronic devices as the at least one external electronic device when the short-range communication with the selected at least one external electronic device fails, based on information that is registered to an account to perform the authentication.

5. The electronic device of claim 1, wherein the processor is configured to:
 select a previously non-selected another at least one external electronic device from among the plurality of external electronic devices when the authentication information is not received from the selected at least one external electronic device, based on information that is registered to an account to perform the authentication, and
 transmit the request for the authentication to the another at least one external electronic device, using at least one identification information corresponding to the another at least one external electronic device.

6. The electronic device of claim 1, wherein the processor is configured to:
 select, when it is determined that the authentication fails, a previously non-selected another at least one external electronic device from among the plurality of external electronic devices based on information that is registered to an account to perform the authentication, and
 perform the authentication based on authentication information received from the another at least one external electronic device, using at least one identification information corresponding to the another at least one external electronic device.

7. The electronic device of claim 1, wherein the processor is configured to select the at least one external electronic device, using information which is registered to an account to perform the authentication, when the information satisfies a designated condition.

8. The electronic device of claim 7, wherein the processor is configured to select, based on a designated order, the at least one external electronic device when the information satisfies another designated condition.

9. The electronic device of claim 7, wherein the registered information comprises at least one of the latest time information at which an external electronic device connects to the electronic device, a frequency at which the external electronic device connects to the electronic device, information representing whether the external electronic device is a master device, and sensor type information of the external electronic device.

10. The electronic device of claim 7, wherein the processor is configured to:
 determine an order of priority of the plurality of external electronic devices through the registered information, and
 select the at least one external electronic device based on the priority order.

11. A method for operating an electronic device, the method comprising:
 storing biometric authentication information of a plurality of external electronic devices and a plurality of identification information respectively corresponding to the plurality of external electronic devices, the plurality of external electronic devices comprising sensors configured to acquire biometric data corresponding to the biometric authentication information;
 detecting an input for an authentication;
 selecting at least one external electronic device from among the plurality of external electronic devices for the authentication;
 transmitting a request for the authentication to the at least one external electronic device, using at least one identification information corresponding to the at least one external electronic device from among the plurality of identification information; and
 performing the authentication, based at least on authentication information received from the at least one external electronic device and the biometric authentication information,
 wherein the authentication information is obtained, by the at least one external electronic device, from a user after the at least one external electronic device receives the request for the authentication.

12. The method of claim 11, wherein the selecting comprises:
 determining one or more external electronic devices corresponding to accounts for performing the authentication from among the plurality of external electronic devices; and
 selecting the at least one external electronic device from among the determined one or more external electronic devices.

13. The method of claim 11, wherein the selecting comprises:
 determining one or more external electronic devices having short-range communication coupling available from among the plurality of external electronic devices; and
 selecting the at least one external electronic device from among the determined one or more external electronic devices.

14. The method of claim 11, further comprising:
 attempting short-range communication coupling with the selected at least one external electronic device; and
 selecting a previously non-selected external electronic device from among the plurality of external electronic devices as the at least one external electronic device when the short-range communication coupling fails, based on information that is registered to an account to perform the authentication.

15. The method of claim 11, wherein the transmitting the request for the authentication comprises:
   selecting a previously non-selected another at least one external electronic device from among the plurality of external electronic devices when the authentication information is not received from the selected at least one external electronic device, based on information that is registered to an account to perform the authentication; and
   transmitting the request for the authentication to the another at least one external electronic device, using at least one identification information corresponding to the another at least one external electronic device.

16. The method of claim 11, wherein performing the authentication comprises: selecting, when it is determined that the authentication fails, a previously non-selected another at least one external electronic device from among the plurality of external electronic devices, based on information that is registered to an account to perform the authentication; and
   performing the authentication based on authentication information received from the another at least one external electronic device, using at least one identification information corresponding to the another at least one external electronic device.

17. The method of claim 11, wherein the selecting the at least one external electronic device comprises, selecting the at least one external electronic device using information which is registered to an account to perform the authentication, based on identifying that the information satisfies a designated condition.

18. The method of claim 17, wherein the selecting the at least one external electronic device comprises selecting, based on a designated order, the at least one external electronic device when the information satisfies another designated condition.

19. The method of claim 17, wherein the registered information comprises at least one of the latest time information at which an external electronic device connects to the electronic device, a frequency at which the external electronic device connects to the electronic device, information representing whether the external electronic device is a master device, and sensor type information of the external electronic device.

20. A non-transitory computer-readable recording medium recording a program when executed by a processor of an electronic device, causes the electronic device to perform the operations of:
   storing biometric authentication information of a plurality of external electronic devices and a plurality of identification information respectively corresponding to the plurality of external electronic devices, the plurality of external electronic devices comprising sensors configured to acquire biometric data corresponding to the biometric authentication information;
   detecting an input for an authentication;
   selecting at least one external electronic device from among the plurality of external electronic devices in relation with the authentication;
   transmitting a request for the authentication to the at least one external electronic device, using at least one identification information corresponding to the at least one external electronic device from among the plurality of identification information; and
   performing the authentication, based at least on authentication information received from the at least one external electronic device and the biometric authentication information,
   wherein the authentication information is obtained, by the at least one external electronic device, from a user after the at least one external electronic device receives the request for the authentication.

* * * * *